(12) United States Patent
Ren et al.

(10) Patent No.: US 12,166,552 B2
(45) Date of Patent: Dec. 10, 2024

(54) CHANNEL MEASUREMENT METHOD AND COMMUNICATION APPARATUS

(71) Applicant: HUAWEI TECHNOLOGIES CO., LTD., Guangdong (CN)

(72) Inventors: Xiang Ren, Shanghai (CN); Shibin Ge, Shanghai (CN); Huangping Jin, Shanghai (CN); Xiaohan Wang, Shanghai (CN); Peng Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 17/681,281

(22) Filed: Feb. 25, 2022

(65) Prior Publication Data

US 2022/0182122 A1 Jun. 9, 2022

Related U.S. Application Data

(63) Continuation of application No. PCT/CN2020/112072, filed on Aug. 28, 2020.

(30) Foreign Application Priority Data

Aug. 30, 2019 (CN) .......................... 201910817870.0

(51) Int. Cl.
*H04B 7/06* (2006.01)
*H04B 7/0413* (2017.01)

(52) U.S. Cl.
CPC ......... *H04B 7/0626* (2013.01); *H04B 7/0413* (2013.01)

(58) Field of Classification Search
CPC .......................... H04B 7/0626; H04B 7/0413
See application file for complete search history.

(56) References Cited

U.S. PATENT DOCUMENTS

| 8,761,283 | B2 | 6/2014 | Ponnampalam |
| 9,306,642 | B2 * | 4/2016 | Wild .................... H04B 7/0417 |
| 10,348,388 | B1 | 7/2019 | Al-Dweik |
| 2009/0016425 | A1 | 1/2009 | Hui et al. |
| 2015/0171939 | A1 | 6/2015 | Davydov et al. |
| 2019/0222274 | A1 | 7/2019 | Dou et al. |

FOREIGN PATENT DOCUMENTS

| CN | 101834814 A | 9/2010 |
| CN | 102165715 A | 8/2011 |
| CN | 108111200 A | 6/2018 |

(Continued)

OTHER PUBLICATIONS

Office Action issued in Chinese Application No. 201910817870.0 on Sep. 26, 2021, 19 pages (with English translation).

(Continued)

*Primary Examiner* — Rahel Guarino
(74) *Attorney, Agent, or Firm* — Fish & Richardson P.C.

(57) ABSTRACT

This application provides example channel measurement methods and example communication apparatuses. One example method includes determining L weighting coefficients for determining channels of K moments based on channels of M moments, where L, M, and K are all positive integers. Information about the L weighting coefficients can then be sent.

20 Claims, 7 Drawing Sheets

(56) References Cited

FOREIGN PATENT DOCUMENTS

| CN | 108809369 | A | 11/2018 |
|----|-----------|----|---------|
| CN | 110071749 | A | 7/2019 |
| EP | 4018687 | A1 | 6/2022 |
| WO | 2021035396 | A1 | 3/2021 |

OTHER PUBLICATIONS

PCT International Search Report and Written Opinion issued in International Application No. PCT/CN2020/112072 on Nov. 13, 2020, 17 pages (with English translation).
Extended European Search Report issued in European Application No. 20857075.4 on Sep. 26, 2022, 10 pages.
Ibing et al., "On Channel Correlation Based Scheduling and Signalling for MIMO-OFDMA Downlink," 2011 IEEE 73rd Vehicular Technology Conference (VTC Spring), May 2011, 5 pages.
Xu et al., "A Time-Variant Channel Prediction and Feedback Framework for Interference Alignment," arXiv preprint, arXiv:1701.00376v1, Jan. 2, 2017, 13 pages.

\* cited by examiner

CHANNEL MEASUREMENT METHOD AND COMMUNICATION APPARATUS

CROSS-REFERENCE TO RELATED APPLICATIONS

This application is a continuation of International Application No. PCT/CN2020/112072, filed on Aug. 28, 2020, which claims priority to Chinese Patent Application No. 201910817870.0, filed on Aug. 30, 2019. The disclosures of the aforementioned applications are hereby incorporated by reference in their entireties.

TECHNICAL FIELD

This application relates to the communication field, and more specifically, to a channel measurement method and a communication apparatus.

BACKGROUND

Some communication systems, for example, a 5th generation (5th generation, 5G) communication system, have higher requirements on system capacities, spectral efficiency, and the like. In the 5G communication system, a massive multiple-input multiple-output (massive multiple-input multiple-output, Massive MIMO) technology plays a critical role in system spectral efficiency.

When the multiple-input multiple-output (massive multiple-input multiple-output, MIMO) technology is used, a network device needs to perform modulation and coding, and signal precoding when sending data to a terminal device. How the network device sends data to the terminal device depends on channel state information (channel state information, CSI) fed back by the terminal device to the network device.

Therefore, accuracy of the CSI is very important to system performance.

SUMMARY

This application provides a channel measurement method and a communication apparatus, so that overheads of feeding back CSI by a terminal device can be reduced, and a network device can learn of a channel status more comprehensively, thereby improving communication performance.

According to a first aspect, a channel measurement method is provided. The method may be performed by a terminal device, or may be performed by a chip, a chip system, or a circuit configured in a terminal device. This is not limited in this application.

The method may include: determining L weighting coefficients, where the L weighting coefficients may be used to determine channels of K moments based on channels of M moments, and L, M, and K are all integers greater than or equal to 1; and sending information about the L weighting coefficients.

The weighting coefficient may be a coefficient related to time domain of a channel, which may also be briefly referred to as a time domain coefficient. The weighting coefficient can indicate a time-varying feature of the channel. The time-varying feature of the channel is a varying feature of the channel in time domain or a varying feature of a time-varying channel in time domain.

The L weighting coefficients may be used to determine the channels of the K moments based on the channels of the M moments. In other words, the channels of the K moments may be obtained based on the channels of the M moments and the L weighting coefficients.

Optionally, the M moments may be before or after the K moments, or the M moments may partially overlap the K moments. This is not limited.

According to the foregoing technical solution, the terminal device may report the L weighting coefficients, and determine the channels of the K moments based on the weighting coefficients and the channels of the M moments. Therefore, a network device can obtain information about an unknown channel based on the L weighting coefficients, and determine a change of a channel in time domain, to learn of a channel status more comprehensively, and make a more reasonable decision for downlink scheduling.

With reference to the first aspect, in some implementations of the first aspect, the method further includes: sending information about T measurement channels, where the T measurement channels are any one of the following: any T measurement channels in N times of channel measurements, the first T measurement channels in the N times of channel measurements, and the last T measurement channels in the N times of channel measurements, where both N and T are integers greater than or equal to 1, and T is greater than or equal to L.

The first T measurement channels in the N times of channel measurements may represent the first T consecutive measurement channels in the N times of channel measurements. The last T measurement channels in the N times of channel measurements may represent the last T consecutive measurement channels in the N times of channel measurements. The any T measurement channels in the N times of channel measurements may represent any T consecutive measurement channels in the N times of channel measurements or any T inconsecutive measurement channels in the N times of channel measurements. A time interval between any two adjacent channels in the any T inconsecutive measurement channels is the same.

According to the foregoing technical solution, the terminal device may report a part of channels obtained through measurement. In other words, the terminal device may report channels obtained through measurement at a part of moments, without reporting all the channels obtained through measurement. This can reduce reporting overheads. In this case, based on the measurement channels and the weighting coefficients reported by the terminal device, the network device can predict a channel of a future moment, and obtain a channel that has been measured by the terminal device but is not reported.

With reference to the first aspect, in some implementations of the first aspect, the determining L weighting coefficients includes: calculating the L weighting coefficients based on P measurement channels, where P is an integer greater than or equal to 1, and is greater than or equal to L.

Optionally, the network device may preconfigure a value of the parameter P, or a value of the parameter P is pre-specified in a protocol.

Optionally, the network device pre-specify values of a plurality of groups of the parameters P or values of a plurality of groups of the parameters P may be pre-specified in a protocol, and the terminal device determines, based on an actual requirement, a quantity of measurement channels actually used to calculate the weighting coefficient.

Optionally, P may be equal to (O+L). O is an integer greater than or equal to 1. O may represent a quantity of equations used to calculate the L weighting coefficients. In other words, the terminal device may calculate the L weighting coefficients using O groups of channels.

Optionally, the P measurement channels may be, for example, historically measured channels. The terminal device may calculate the weighting coefficient based on a previously measured channel. Alternatively, optionally, the P measurement channels may be, for example, channels currently measured by the terminal device. The terminal device may first perform channel measurement, and calculate the weighting coefficient based on a result of the channel measurement. The measurement channel used by the terminal device to calculate the weighting coefficient may be a part of channels measured by the terminal device.

With reference to the first aspect, in some implementations of the first aspect, a time interval between any two adjacent channels in the P measurement channels is the same as a time interval between any two adjacent channels in at least L measurement channels in the T measurement channels.

According to the foregoing technical solution, the time interval between any two adjacent channels in the measurement channels used to calculate the weighting coefficient is consistent with the time interval between any two adjacent channels in the at least L measurement channels in the T measurement channels reported by the terminal device, so that the network device can learn of accurate channel information based on the L measurement channels and the L weighting coefficients, to ensure communication performance.

With reference to the first aspect, in some implementations of the first aspect, the method further includes: obtaining information about the parameter L and information about the parameter O; the determining L weighting coefficients includes: calculating L' weighting coefficients based on the parameter L and the parameter O using the O groups of channels, where both O and L' are integers greater than or equal to 1, and L' is less than or equal to L; and the sending information about the L weighting coefficients includes: sending information about the L' weighting coefficients.

Optionally, the parameter L and/or the parameter O may be pre-specified in a protocol, and the terminal device determines the parameter L and the parameter O based on an actual requirement.

Optionally, the network device may preconfigure the parameter L and/or the parameter O, and the terminal device determines the parameter L and the parameter O based on an actual requirement.

According to the foregoing technical solution, after the terminal device learns of the value of the parameter L, the quantity of weighting coefficients calculated by the terminal device may be less than L. In other words, the weighting coefficients reported by the terminal device may be less than L. For example, the terminal device may select, based on an actual situation, that the quantity of calculated weighting coefficients is less than L.

With reference to the first aspect, in some implementations of the first aspect, the obtaining information about the parameter L and information about the parameter O includes: determining a target {L, O} from one or more groups of {L, O}; and determining the value of the parameter L and a value of the parameter O based on the target {L, O}.

Optionally, the network device preconfigures a plurality of groups of {L, O} parameter value combinations, or a plurality of groups of {L, O} parameter value combinations are pre-specified in a protocol.

Optionally, the plurality of groups of {L, O} may be some dynamically configured values. For example, the network device dynamically configures the plurality of groups of {L, O} for the terminal device based on an actual situation. Alternatively, the plurality of groups of {L, O} may be some fixed values. For example, the parameter group {L, O} may include {4, 3}, {3, 2}, {4, 2}, and the like. This is not limited.

According to the foregoing technical solution, the network device preconfigures the plurality of groups of {L, O}, or the plurality of groups of {L, O} may be pre-specified in the protocol, so that an appropriate group of {L, O} may be selected based on an actual situation. This improves prediction accuracy.

With reference to the first aspect, in some implementations of the first aspect, each of the one or more groups of {L, O} corresponds to one or more of the following information: measurement duration, a pilot time-domain density, a quantity of pilot transmissions, a pilot transmission periodicity, and a moving speed.

According to the foregoing technical solution, the network device preconfigures the plurality of groups of {L, O} or the plurality of groups of {L, O} are pre-specified in the protocol, and the {L, O} to a measurement periodicity, the quantity of pilot transmissions, and the pilot time-domain density can reduce signaling overheads. Alternatively, bounding the {L, O} to the moving speed can improve accuracy of calculating the weighting coefficient, and reduce signaling overheads.

With reference to the first aspect, in some implementations of the first aspect, the method further includes: sending indication information, where the indication information is used to indicate an index of the target {L, O}.

According to a second aspect, a channel measurement method is provided. The method may be performed by a network device, or may be performed by a chip, a chip system, or a circuit configured in a network device. This is not limited in this application.

The method may include: receiving information about L weighting coefficients, where the L weighting coefficients may be used to determine channels of K moments based on channels of M moments, and L, M, and K are all integers greater than or equal to 1; and determining the L weighting coefficients.

According to the foregoing technical solution, the network device may determine the L weighting coefficients based on the information about the L weighting coefficients that is reported by a terminal device. The channels of the K moments may be determined based on the weighting coefficients and the channels of the M moments. Therefore, the network device can obtain information about an unknown channel based on the L weighting coefficients, and determine a change of a channel in time domain, to learn of a channel status more comprehensively, and make a more reasonable decision for downlink scheduling.

With reference to the second aspect, in some implementations of the second aspect, the method further includes: receiving information about T measurement channels, where the T measurement channels are any one of the following: any T measurement channels in N times of channel measurements, the first T measurement channels in the N times of channel measurements, and the last T measurement channels in the N times of channel measurements, where both N and T are integers greater than or equal to 1, and T is greater than or equal to L.

According to the foregoing technical solution, reporting overheads can be reduced. In addition, based on the measurement channels and the weighting coefficients reported by the terminal device, the network device can predict a channel of a future moment, and obtain a channel that has been measured by the terminal device but is not reported.

With reference to the second aspect, in some implementations of the second aspect, the method further includes: sending information indicating a parameter O and the parameter L; and the receiving information about L weighting coefficients includes: receiving information about L' weighting coefficients, where the L' weighting coefficients are calculated based on the parameter O and the parameter L using O groups of channels, and both O and L' are integers greater than or equal to 1, and L' is less than or equal to L.

Optionally, the network device may preconfigure the parameter L and/or the parameter O, and the terminal device determines the parameter L and the parameter O based on an actual requirement.

With reference to the second aspect, in some implementations of the second aspect, the sending information indicating a parameter O and the parameter L includes: sending information indicating one or more groups of {L, O}, where the one or more groups of {L, O} are used to determine a value of the parameter L and a value of the parameter O.

Optionally, the network device preconfigures a plurality of groups of {L, O} parameter value combinations, or a plurality of groups of {L, O} parameter value combinations are pre-specified in a protocol.

Optionally, the plurality of groups of {L, O} may be some dynamically configured values. For example, the network device dynamically configures the plurality of groups of {L, O} for the terminal device based on an actual situation. Alternatively, the plurality of groups of {L, O} may be some fixed values. For example, the parameter group {L, O} may include {4, 3}, {3, 2}, {4, 2}, and the like. This is not limited.

Optionally, the network device may indicate, to the terminal device, a specific group of {L, O} used to calculate the weighting coefficient; or the terminal device may determine a specific group of {L, O} used to calculate the weighting coefficient.

With reference to the second aspect, in some implementations of the second aspect, each of the one or more groups of {L, O} corresponds to one or more of the following information: measurement duration, a pilot time-domain density, a quantity of pilot transmissions, a pilot transmission periodicity, and a moving speed.

With reference to the second aspect, in some implementations of the second aspect, the method further includes: receiving indication information, where the indication information is used to indicate an index of the target {L, O}.

According to a third aspect, a communication apparatus is provided. The communication apparatus is configured to perform the communication method provided in the first aspect. Specifically, the communication apparatus may include modules configured to perform the communication method provided in the first aspect.

According to a fourth aspect, a communication apparatus is provided. The communication apparatus is configured to perform the communication method provided in the second aspect. Specifically, the communication apparatus may include modules configured to perform the communication method provided in the second aspect.

According to a fifth aspect, a communication apparatus is provided, including a processor. The processor is coupled to a memory, and may be configured to execute instructions in the memory, to implement the communication method in any one of the first aspect or the possible implementations of the first aspect.

Optionally, the communication apparatus further includes the memory.

Optionally, the communication apparatus further includes a communication interface, the processor is coupled to the communication interface, and the communication interface is configured to input and/or output information. The information includes at least one of data and instructions.

In an implementation, the communication apparatus is a terminal device. When the communication apparatus is the terminal device, the communication interface may be a transceiver or an input/output interface.

In another implementation, the communication apparatus is a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system configured in a terminal device.

Optionally, the transceiver may be a transceiver circuit. Optionally, the input/output interface may be an input/output circuit.

According to a sixth aspect, a communication apparatus is provided, including a processor. The processor is coupled to a memory, and may be configured to execute instructions in the memory, to implement the communication method in any one of the second aspect or the possible implementations of the second aspect.

Optionally, the communication apparatus further includes the memory.

Optionally, the communication apparatus further includes a communication interface, the processor is coupled to the communication interface, and the communication interface is configured to input and/or output information. The information includes at least one of data and instructions.

In an implementation, the communication apparatus is a network device. When the communication apparatus is the network device, the communication interface may be a transceiver or an input/output interface.

In another implementation, the communication apparatus is a chip or a chip system. When the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system configured in a network device.

Optionally, the transceiver may be a transceiver circuit. Optionally, the input/output interface may be an input/output circuit.

According to a seventh aspect, a communication apparatus is provided. The communication apparatus includes a processor and an interface, and the processor is coupled to a memory through the interface. When the processor executes a computer program or instructions in the memory, the method in any one of the first aspect or the possible implementations of the first aspect is performed.

According to an eighth aspect, a communication apparatus is provided. The communication apparatus includes a processor and an interface, and the processor is coupled to a memory through the interface. When the processor executes a computer program or instructions in the memory, the method in any one of the second aspect or the possible implementations of the second aspect is performed.

According to a ninth aspect, a chip is provided. The chip includes a processor and an interface, and is configured to invoke a computer program from a memory, and execute the computer program stored in the memory, to perform the method in any one of the first aspect or the possible implementations of the first aspect.

According to a tenth aspect, a chip is provided. The chip includes a processor and an interface, and is configured to invoke a computer program from a memory, and execute the computer program stored in the memory, to perform the method in any one of the second aspect or the possible implementations of the second aspect.

According to an eleventh aspect, a computer-readable storage medium is provided. The computer-readable storage medium stores a computer program. When the computer program is executed by a communication apparatus, the communication apparatus is enabled to implement the method in any one of the first aspect or the possible implementations of the first aspect.

According to a twelfth aspect, a computer-readable storage medium is provided. The computer-readable storage medium stores a computer program. When the computer program is executed by a communication apparatus, the communication apparatus is enabled to implement the method in any one of the second aspect or the possible implementations of the second aspect.

According to a thirteenth aspect, a computer program product including instructions is provided. When the instructions are executed by a computer, a communication apparatus is enabled to implement the communication method provided in the first aspect.

According to a fourteenth aspect, a computer program product including instructions is provided. When the instructions are executed by a computer, a communication apparatus is enabled to implement the communication method provided in the second aspect.

According to a fifteenth aspect, a communication system is provided, and includes the foregoing network device and terminal device.

DESCRIPTION OF EMBODIMENTS

Figure 1:
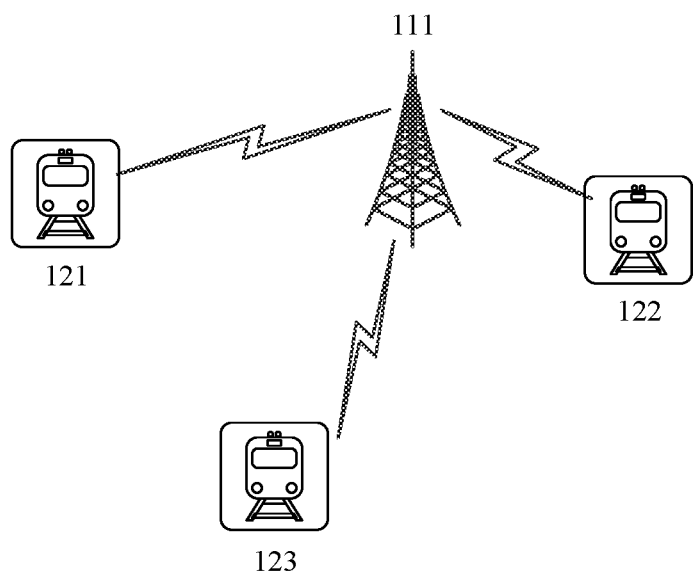
FIG. 1 and FIG. 2 each are a schematic diagram of a communication system to which an embodiment of this application is applicable.

The following describes technical solutions in this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a 5th generation (5th generation, 5G) mobile communication system, or a new radio (new radio, NR) system. The 5G mobile communication system may include non-standalone (non-standalone, NSA) and/or standalone (standalone, SA).

The technical solutions provided in this application may further be applicable to a future communication system, for example, a 6th generation mobile communication system. The communication system may alternatively be a PLMN network, a device-to-device (device-to-device, D2D) network, a machine to machine (machine to machine, M2M) network, an Internet of Things (Internet of Things, IoT) network, or another network. The IoT network may include, for example, the Internet of Vehicles. Communication modes in an Internet of Vehicles system are collectively referred to as V2X (where X represents everything). For example, V2X communication includes vehicle-to-vehicle (vehicle-to-vehicle, V2V) communication, vehicle-to-infrastructure (vehicle-to-infrastructure, V2I) communication, vehicle-to-pedestrian (vehicle-to-pedestrian, V2P) communication, or vehicle-to-network (vehicle-to-network, V2N) communication.

A terminal device in embodiments of this application may also be referred to as user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for users, for example, a handheld device or a vehicle-mounted device that has a wireless connection function. Currently, the terminal is, for example, a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, and a terminal device in a future evolved public land mobile network (public land mobile network, PLMN). This is not limited in embodiments of this application.

By way of example but not limitation, in embodiments of this application, the terminal device may alternatively be a wearable device. The wearable device may also be referred to as a wearable intelligent device, which is an umbrella term of wearable devices that are developed by applying wearable technologies to intelligent designs of daily wear, such as glasses, gloves, watches, clothes, and shoes. The wearable device is a portable device that can be directly worn by a user or integrated into clothes or an accessory of a user. The wearable device is more than a hardware device. The wearable device can implement powerful functions through data exchange and cloud interaction using software. Wearable intelligent devices in a broad sense include full-featured and large-size devices that can implement complete or partial functions without depending on smartphones, for example, smart watches or smart glasses, and application-specific devices that coordinate with smartphones or other devices, for example, various smart bands or smart jewelry for monitoring physical signs.

In addition, the terminal device in embodiments of this application may alternatively be a terminal device in an IoT system. IoT is an important part of future development of information technologies. A main technical feature of the IoT is that things are connected to networks using communication technologies, to implement intelligent networks for interconnection between persons and machines and between things. In embodiments of this application, the IoT technologies can implement massive connections, deep coverage, and terminal power saving using, for example, the narrowband (narrowband, NB) technology.

In addition, in embodiments of this application, the terminal device may alternatively be a sensor, for example, an intelligent printer, a train detector, or a gas station, which is mainly configured to collect data (of some terminal devices), receive control information and downlink data from a network device, send electromagnetic waves, and transmit uplink data to the network device.

In addition, the network device in embodiments of this application may be a device in communication with the terminal device. The network device may be a base transceiver station (base transceiver station, BTS) in a global system for mobile communications (global system for mobile communications, GSM) system or a code division multiple access (code division multiple access, CDMA) system, may be a NodeB (NodeB, NB) in a wideband code division multiple access (wideband code division multiple access, WCDMA) system, may be an evolved NodeB (evolved NodeB, eNB or eNodeB) in an LTE system, or may be a radio controller in a cloud radio access network (cloud radio access network, C-RAN) scenario. Alternatively, the network device may be a relay node, an access point, a vehicle-mounted device, a wearable device, a network device in a future 5G network, a network device in a future evolved PLMN network, or the like. This is not limited in embodiments of this application.

The network device in embodiments of this application may be a device in a wireless network, for example, a radio access network (radio access network, RAN) node that connects a terminal to the wireless network. Currently, the RAN node is, for example, a base station, a next generation NodeB gNB, a transmission reception point (transmission reception point, TRP), an evolved NodeB (evolved NodeB, eNB), a home base station, a baseband unit (baseband unit, BBU), or an access point (access point, AP) in a Wi-Fi system.

In a network structure, the network device may include a centralized unit (centralized unit, CU) node or a distributed unit (distributed unit, DU) node, or may be a RAN device including a CU node and a DU node, or may be a RAN device including a control plane CU node (CU-CP node), a user plane CU node (CU-UP node), and a DU node.

In embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). An operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD), a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

For ease of understanding embodiments of this application, a communication system to which an embodiment of this application is applicable is first described in detail with reference to FIG. 1 and FIG. 2.

FIG. 1 is a schematic diagram of a wireless communication system 100 to which an embodiment of this application is applicable. As shown in FIG. 1, the wireless communication system 100 may include at least one network device, for example, a network device 111 shown in FIG. 1. The wireless communication system 100 may further include at least one terminal device, for example, a terminal device 121 to a terminal device 123 shown in FIG. 1. A plurality of antennas may be configured for each of the network device and the terminal device. The network device and the terminal device may communicate with each other by using a multi-antenna technology.

When the network device communicates with the terminal device, the network device may manage one or more cells, and there may be an integer quantity of terminal devices in one cell. Optionally, the network device 111 and the terminal device 121 to the terminal device 123 form a single-cell communication system. Without loss of generality, a cell is denoted as a cell #1. The network device 111 may be a network device in the cell #1. In other words, the network device 111 may serve a terminal device (for example, the terminal device 121) in the cell #1.

It should be noted that a cell may be understood as an area within coverage of radio signals of the network device.

Figure 2:
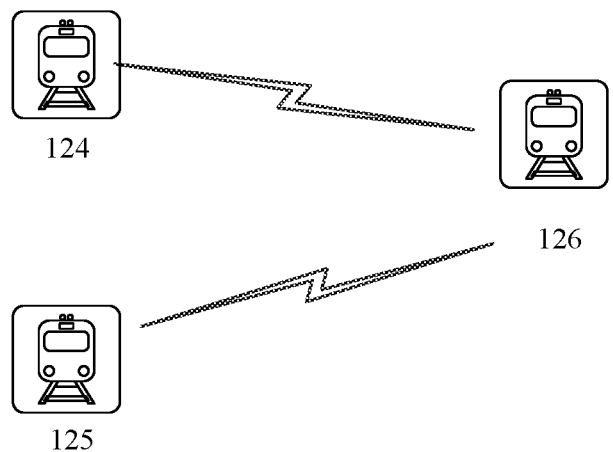

FIG. 2 is another schematic diagram of a wireless communication system 200 to which an embodiment of this application is applicable. As shown in FIG. 2, the technical solutions of embodiments of this application may be further applied to D2D communication. The wireless communication system 200 includes a plurality of terminal devices, for example, a terminal device 124 to a terminal device 126 in FIG. 2. The terminal device 124 to the terminal device 126 may directly communicate with each other. For example, the terminal device 124 and the terminal device 125 may separately or simultaneously send data to the terminal device 126.

It should be understood that FIG. 1 and FIG. 2 are merely examples for description, and this application is not limited thereto. For example, embodiments of this application may be applied to any communication system, provided that there are at least two devices in the communication system. One of the devices sends indication information to indicate a transmission direction, and another device receives the indication information, and may determine a transmission direction within specific duration based on the indication information.

For ease of understanding embodiments of this application, the following first briefly describes several terms in this application.

1. Precoding technology: When a channel status is known, a sending device (for example, a network device) may process a to-be-sent signal based on a precoding matrix that matches the channel status, so that a precoded to-be-sent signal adapts to a channel, and a receiving device (for example, a terminal device) eliminates inter-channel impact with less complexity. Therefore, precoding the to-be-sent signal can improve quality (for example, a signal to interference plus noise ratio (signal to interference plus noise ratio, SINR)) of a received signal. Therefore, the precoding technology can implement transmission between a transmit device and a plurality of receive devices on a same time-frequency resource, that is, implement multi-user multiple-input multiple-output (multiple user multiple-input multiple-output, MU-MIMO).

It should be understood that the related description of the precoding technology is merely an example for ease of understanding, and is not intended to limit the protection scope of embodiments of this application. In a specific implementation process, the sending device may alternatively perform precoding in another manner. For example, when channel information (for example, but not limited to, a channel matrix) cannot be obtained, precoding is performed based on a preset precoding matrix or in a weighting processing manner. For brevity, details are not described in the specification.

In embodiments of this application, the network device may predict a status of an unknown channel based on the known channel, and further process the to-be-sent signal based on the precoding matrix that matches the predicted channel status, so that the precoded to-be-sent signal adapts to the channel.

2. Reference signal (reference signal, RS): The reference signal may also be referred to as a pilot (pilot), a reference sequence, or the like. In embodiments of this application, the reference signal may include a non-precoded reference signal (non-precoded RS) and a precoded reference signal. The precoded reference signal may also be referred to as a beamformed reference signal (beamformed RS), or may also be briefly referred to as a precoded reference signal. In the following embodiments, the reference signal that is precoded, the precoded reference signal, and the beamformed reference signal convey a same meaning.

In addition, the following described reference signal sometimes is merely a non-precoded reference signal, a precoded reference signal, or includes both a non-precoded reference signal and a precoded reference signal. A person skilled in the art may understand meanings conveyed by the reference signal in different scenarios.

The non-precoded reference signal may be similar to a class A (Class A) reference signal defined in an LTE or NR protocol. The beamformed reference signal may be similar to a class B (Class B) reference signal in the LTE protocol.

It should be understood that, the reference signal in embodiments of this application may be a reference signal used for channel measurement. For example, the reference signal may be a channel state information reference signal (channel state information reference signal, CSI-RS) or a sounding reference signal (sounding reference signal, SRS). However, it should be understood that the foregoing descriptions are merely examples, and shall not constitute any limitation on this application. This application does not exclude a possibility of defining another reference signal implementing a same or similar functions in a future protocol.

3. Time domain vector: The time domain vector may be used to represent a change of a channel in time domain. Each time domain vector may represent a time-varying rule of the channel. A radio channel is a time-varying channel, and is subject to various attenuation losses. For example, a time-frequency dual selective fading channel is a typical time-varying channel, which is affected by both frequency selective fading caused by a multipath delay spread and time selective fading caused by a Doppler shift.

The Doppler shift (Doppler shift) may be a shift between a transmit frequency and a receive frequency caused by relative movement between a terminal device and a network device, and a difference between the receive frequency and the transmit frequency is referred to as the Doppler shift. Generally, the Doppler shift $f_d$ may be defined as: $f_d = v \times f_c \times \cos \theta /c$. $v$ represents a moving speed of the terminal device, $f_c$ represents a carrier frequency, $\theta$ represents an angle of incidence of a multipath signal, and $c$ represents the speed of light. During specific implementation, angles $\theta$ of incidence of different transmission paths may be considered. Because angles $\theta$ of incidence of a plurality of paths are different, different transmission paths correspond to different Doppler shifts, causing a Doppler spread (Doppler spread). Generally, a value of the Doppler shift indicates impact of the moving speed on a speed of the change of the channel in time domain.

It should be understood that, the time domain vector is defined merely for ease of distinguishing from a spatial domain vector and a frequency domain vector described below. This shall not constitute any limitation on this application. This application does not exclude a possibility of defining another name for the time domain vector in a future protocol to convey a meaning the same as or similar to that of the time domain vector.

Optionally, the time domain vector is one or more of a discrete Fourier transform (Discrete Fourier Transform, DFT) vector, an oversampled DFT vector, a wavelet transform (wavelet transform, WT) vector, or an oversampled WT vector. This is not limited in this application.

4. Spatial domain vector (spatial domain vector): The spatial domain vector is also referred to as a beam (beam) vector, an angle vector, or the like. Each element in the spatial domain vector may represent a weight of each antenna port (antenna port). Based on the weight of each antenna port that is represented by each element in the spatial domain vector, signals of the antenna ports are linearly superposed, to form an area with a strong signal in a specific direction in space. A reference signal is precoded based on the spatial domain vector, so that the transmitted reference signal has specific spatial directivity. Therefore, the process of precoding the reference signal based on the spatial domain vector may also be considered as a spatial domain-based (or briefly referred to as spatial domain) precoding process.

A length of the spatial domain vector may be equal to a quantity $N_s$ of transmit antenna ports in one polarization direction, where $N_s$ is an integer greater than or equal to 1. The spatial domain vector may be, for example, a column vector or a row vector whose length is $N_s$. This is not limited in this application.

Optionally, the spatial domain vector is obtained from a DFT matrix. Each column vector in the DFT matrix may be referred to as a DFT vector. In other words, the spatial domain vector may be a DFT vector. The spatial domain vector may alternatively be, for example, a two-dimensional (2 dimensions, 2D)-discrete Fourier transform (Discrete Fourier Transform, DFT) vector or an oversampled 2D-DFT vector defined in a type II (type II) codebook in the NR protocol TS 38.214 Release 15 (release 15, R15). For brevity, details are not described herein.

5. Frequency domain vector (frequency domain vector): The frequency domain vector is also referred to as a delay vector or the like. The frequency domain vector is a vector that may be used to represent a change rule of a channel in frequency domain. Each frequency domain vector may represent a change rule. A signal may travel through a plurality of paths from a transmit antenna and a receive antenna during transmission over a radio channel. Frequency selective fading caused by a multipath delay is a change in a frequency domain channel. Therefore, different frequency domain vectors may be used to represent a change rule of the channel in frequency domain caused by delays on different transmission paths. However, because a phase change of a channel in each frequency domain unit is related to a delay, it can be learned from the Fourier transform that a time delay of a signal in time domain may be equivalent to a phase gradient in frequency domain. Therefore, the frequency domain vector may also be referred to as a delay vector. In other words, the frequency domain vector may also be used to represent a delay feature of a channel.

Precoding a reference signal based on a frequency domain vector may essentially mean that phase rotation is performed on each frequency domain unit in frequency domain based on an element in the frequency domain vector, to pre-compensate, based on a precoded reference signal, a frequency selective feature caused by a multipath delay. Therefore, the process of precoding a reference signal based on a frequency domain vector may be considered as a process of performing frequency domain precoding.

In embodiments of this application, the frequency domain vector and the spatial domain vector may be used to construct a plurality of combinations of spatial domain vectors and frequency domain vectors, which are also referred to as spatial-frequency vector pairs for short, to construct a precoding vector.

A length of the frequency domain vector may be denoted as $N_3$, where $N_3$ is an integer greater than or equal to 1.

6. Spatial-frequency vector pair: The spatial-frequency vector pair may be obtained by combining one spatial domain vector and one frequency domain vector. One spatial-frequency vector pair may include one spatial domain vector and one frequency domain vector. One spatial-frequency component matrix may be obtained using a spatial domain vector and a frequency domain vector in one spatial-frequency vector pair.

In embodiments of this application, spatial domain vectors and/or frequency domain vectors included in any two spatial-frequency vector pairs are different. In other words, spatial-frequency component matrices constructed by any two spatial-frequency vector pairs are also different.

7. Spatial-frequency matrix: The spatial-frequency matrix may be understood as an intermediate variable used to determine a precoding matrix corresponding to each frequency domain unit. For a terminal device, the spatial-frequency matrix may be determined based on the precoding matrix or a channel matrix corresponding to each frequency domain unit. For a network device, the spatial-frequency matrix may be obtained based on a weighted sum of a plurality of spatial-frequency component matrices, to recover a downlink channel or a precoding matrix.

For example, the spatial-frequency matrix may be denoted as H, and H=[$w_1$ $w_2$ • • • $w_N$]. $W_1$ to $w_N$ are $N_3$ column vectors corresponding to $N_3$ frequency domain units, each column vector may be a precoding matrix corresponding to each frequency domain unit, and a length of each column vector may be $N_s$. The $N_3$ column vectors correspond to precoding vectors of the $N_3$ frequency domain units. That is, the spatial-frequency matrix may be considered as a joint matrix formed by combining the precoding vectors corresponding to the $N_3$ frequency domain units.

It should be understood that the spatial-frequency matrix is merely a representation form used to determine an intermediate variable of the precoding matrix, and should not constitute any limitation on this application. For example, the column vectors in the spatial-frequency matrix are successively arranged head to end from left to right, or are arranged according to another predefined rule, to obtain a vector whose length is $N_s \times N_3$. The vector may be referred to as a spatial-frequency vector.

It should be further understood that the dimensions of the spatial-frequency matrix and the spatial-frequency vector shown above are merely examples, and should not constitute any limitation on this application. For example, the spatial-frequency matrix may alternatively be a matrix whose dimensions are $N_3 \times N_s$. Each row vector may correspond to one frequency domain unit, to determine a precoding vector of the corresponding frequency domain unit.

In addition, when a plurality of polarization directions are configured for a transmit antenna, the dimensions of the spatial-frequency matrix may further be extended. For example, for a transmit antenna with dual polarization directions, the dimensions of the spatial-frequency matrix may be $2N_s \times N_3$ or $N_3 \times 2N_s$. It should be understood that a quantity of polarization directions of a transmit antenna is not limited in this application.

It should be understood that, how to determine the spatial-frequency matrix is not limited in embodiments of this application. For example, the spatial-frequency matrix may be determined based on each receive antenna, or may be determined based on each transport layer.

8. Pilot transmission periodicity: The pilot transmission periodicity refers to a time interval between two adjacent pilot transmissions.

9. Pilot time-domain density: The pilot time-domain density is a quantity of times for which a reference signal is transmitted in a predefined time unit, or a ratio of a time domain resource used to transmit a reference signal this time to the time unit. One time unit may include, for example, one or more pilot transmission periodicities, and a corresponding pilot time-domain density may be, for example, 1 or greater than 1.

10. Measurement duration: A terminal device may perform channel measurement within a period of time based on an indication of a network device in embodiments of this application. The period of time may be referred to as measurement duration. A time length of the period of time may be indicated by the network device using signaling. For example, the time length is notified through higher layer signaling (for example, a radio resource control (radio resource control, RRC) message). The measurement duration may alternatively be predefined, for example, defined in a protocol. This is not limited in this application.

The network device may notify, using signaling, the terminal device to start channel measurement. For example, the network device may notify the terminal device of a start moment and/or duration of the period of time using signaling, or the network device may trigger, using signaling, the terminal device to start channel measurement. The terminal device may receive, a plurality of times within the measurement duration, reference signals used for channel measurement, and may perform channel measurement based on the reference signals received the plurality of times, to feed back a time-varying feature of a channel to the network device.

It should be understood that, that the network device notifies, using signaling, the terminal device to start channel measurement does not mean that the terminal device keeps performing channel measurement at the start moment or a trigger moment indicated by the network device. The network device only notifies, using signaling, the terminal device that channel measurement can be performed, and the terminal device may perform channel measurement based on the received reference signal within a time window after the start moment or the trigger moment. A size of the time window is the measurement duration.

It should be further understood that, the feedback herein is a feedback of the time-varying feature of the channel by the terminal device, but this does not mean that the terminal device does not provide other feedbacks. For example, the terminal device may provide a feedback within the period of time in a dual-domain compression feedback manner, or may provide a feedback within the period of time in a type II codebook feedback manner. For brevity, examples are not listed one by one herein. It should be noted that other feedbacks provided by the terminal device within this period of time are independent processes from the feedback of the time-varying feature of the channel described in this application.

The terminal device may receive reference signals a plurality of times within the measurement duration. A quantity of times for which the terminal device receives reference signals within the measurement duration may be a product of a ratio of the measurement duration to the foregoing time unit and the pilot time-domain density.

11. Quantity of pilot transmissions: In embodiments of this application, the quantity of pilot transmissions may be a total quantity of times for which a network device sends reference signals used for channel measurement, or a total quantity of times for which a terminal device receives reference signals used for channel measurement. The quantity of pilot transmissions may be specifically a total quantity of pilot transmissions within a period of time. When the quantity of pilot transmissions is greater than 1, the plurality of pilot transmissions may be a plurality of times of transmission within the period of time. In other words, the plurality of pilot transmissions are transmissions performed at a plurality of moments.

The quantity of pilot transmissions may be indicated by the network device using signaling, for example, higher layer signaling (for example, an RRC message). Alternatively, the quantity of pilot transmissions may be predefined, for example, defined in a protocol. This is not limited in this application.

Figure 3:
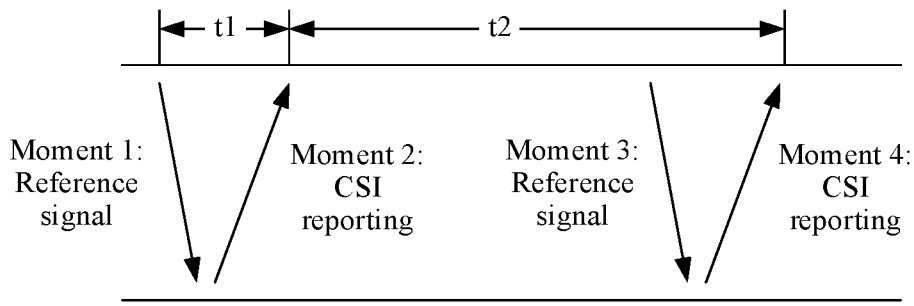
FIG. 3 is a schematic flowchart of feeding back CSI by a terminal device.

FIG. 3 is a schematic flowchart of feeding back CSI by a terminal device. As shown in FIG. 3, a network device sends a reference signal at a moment 1, and the terminal device may perform channel measurement and feedback at a moment 2 after receiving the reference signal. Because the network device may send reference signals periodically, aperiodically, or semi-persistently, there may be a period of time between a moment at which the network device sends a reference signal currently and a moment at which the network device sends a reference signal is sent next time. As shown in FIG. 3, the network device sends a reference signal next time at a moment 3, and the terminal device performs channel measurement and feedback at a moment 4 based on the reference signal sent next time. It can be learned that there is a time interval t1 between the moment 1 and the moment 2, and there is a time interval t2 between the moment 2 and the moment 4. During the time interval t2, all precoding matrices used by the network device to perform downlink transmission are determined based on a feedback received at the moment 2. However, the channel may have changed during the time interval t2. If the precoding matrix determined based on the feedback at the moment 2 is directly used for precoding for subsequent downlink transmission, the precoding matrix may fail to well adapt to a downlink channel. Consequently, transmission performance may deteriorate. This case in which a precoding matrix determined based on a feedback cannot match an actual channel because a channel is time varying is referred to as CSI expiration. In other words, when the channel changes rapidly with time, the CSI expiration may cause significant deterioration in transmission performance.

In addition, if CSI measurement and CSI reporting are frequently performed to reduce impact of the CSI expiration on system performance, overheads of downlink CSI-RS measurement and overheads of uplink CSI reporting may sharply increase, greatly reducing spectral efficiency.

In view of this, this application provides a channel measurement method. According to the channel measurement method provided in this application, a weighting coefficient is fed back based on a result obtained by measuring channels for a plurality of times by a terminal device, so that a network device may predict a time-varying trend of a channel based on the weighting coefficient. This can improve feedback accuracy, reduce feedback overheads, and therefore improve system performance.

The following describes in detail embodiments provided in this application with reference to the accompanying drawings.

Figure 4:
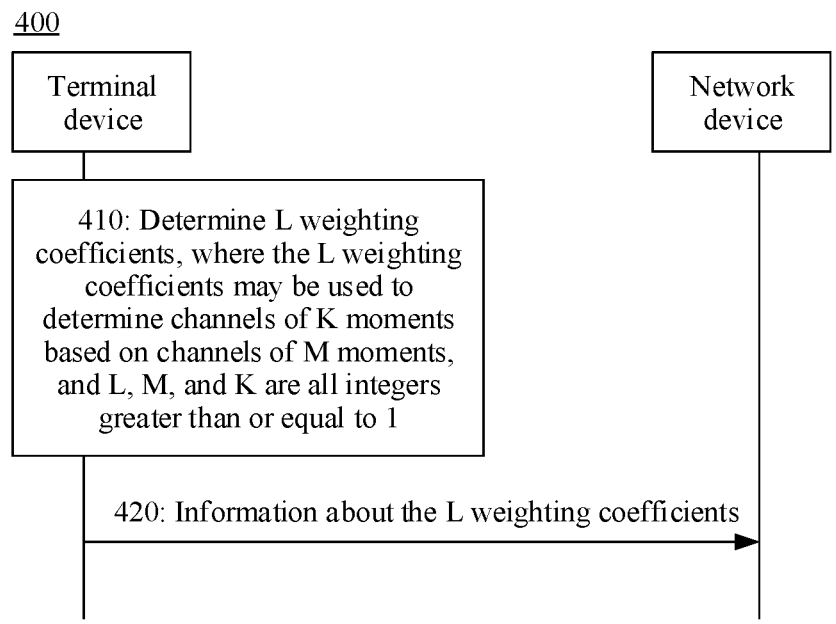
FIG. 4 is a schematic diagram of a channel measurement method according to an embodiment of this application.

FIG. 4 is a schematic interaction diagram of a channel measurement method 400 according to an embodiment of this application. The method 400 may include the following steps.

410: A terminal device determines L weighting coefficients, where the L weighting coefficients may be used to determine channels of K moments based on channels of M moments, and L, M, and K are all integers greater than or equal to 1.

The weighting coefficient may represent a coefficient related to channel time domain, and may also be briefly referred to as a time domain coefficient. The weighting coefficient can represent a time-varying feature of a channel. The time-varying feature of the channel is a varying feature of the channel in time domain or a varying feature of a time-varying channel in time domain.

It should be understood that the weighting coefficient is defined only for ease of differentiation, and should not constitute any limitation on this application. A specific name of the weighting coefficient is not limited in this application. This application does not rule out a possibility of defining another name for the weighting coefficient in a future protocol to convey a same or similar meaning as the weighting coefficient. For example, the weighting coefficient may also be referred to as a Doppler correlation coefficient. The weighting coefficient is uniformly used for description below.

The L weighting coefficients may be used to determine the channels of the K moments based on the channels of the M moments. The M moments may be before or after the K moments, or the M moments may partially overlap the K moments. This is not limited.

In other words, the channels of the K moments may be obtained based on the channels of the M moments and the L weighting coefficients. It may be understood that information about an unknown channel may be predicted based on a known channel and a weighting coefficient.

The known channel is a channel that is known to a network device. For example, the terminal device measures one or more channels, and reports the one or more channels to the network device. The network device may further learn of statuses of the one or more channels.

The unknown channel is a channel that is unknown to the network device. For example, the terminal device measures one or more channels, and reports a part of the one or more channels to the network device. The network device may further learn of statuses of the part of channels, and a remaining channel that is not reported or a channel of a future moment is an unknown channel.

It should be understood that the known channel and the unknown channel are merely descriptions for ease of understanding, and do not limit the protection scope of embodiments of this application. Based on this application, the network device may determine the unknown channel based on the known channel and the weighting coefficient.

The following describes in detail how to determine the weighting coefficient and how to predict the unknown channel based on the known channel and the weighting coefficient.

420: The terminal device sends information about the L weighting coefficients to the network device.

Correspondingly, the network device receives the information about the L weighting coefficients.

Generally, a varying feature of a channel in time domain may be represented as a weighted sum of a plurality of slowly varying Doppler frequencies. Due to slow variation of the Doppler frequency, channel variation of the channel in coherence time is correlated. A channel of the $n^{th}$ moment may be approximately represented as a weighted sum of historical channels of previous L moments, namely, $y(n)=\Sigma_{l=1}^{L}a_l y(n-l)$. y (n) represents the channel of the $n^{th}$ moment, and $a_l$ is the weighting coefficient. It can be found that the time-varying channel conforms to an autoregressive (autoregressive, AR) model. In this application, according to this feature, the terminal device reports the L weighting coefficients, so that the network device may predict channel time variation based on the L weighting coefficients, that is, predict the unknown channel.

For example, the network device may obtain, based on the L weighting coefficients, a channel that has been measured by the terminal device but is not reported.

The terminal device may report a part of channels obtained through measurement, and does not need to report all the channels obtained through measurement. The network device may obtain the unreported channel based on the L weighting coefficients and the reported part of channels.

For example, the network device may further predict a channel of a future moment based on the L weighting coefficients.

The terminal device may report a part or all of the channels obtained through measurement, and the network device may predict a channel of a future moment based on the L weighting coefficients and the reported channel. This can reduce performance losses caused by CSI expiration, reduce CSI reporting overheads, and improve system performance.

Descriptions are provided by using examples below with reference to FIG. 5(a) to FIG. 5(c).

Figure 5A:
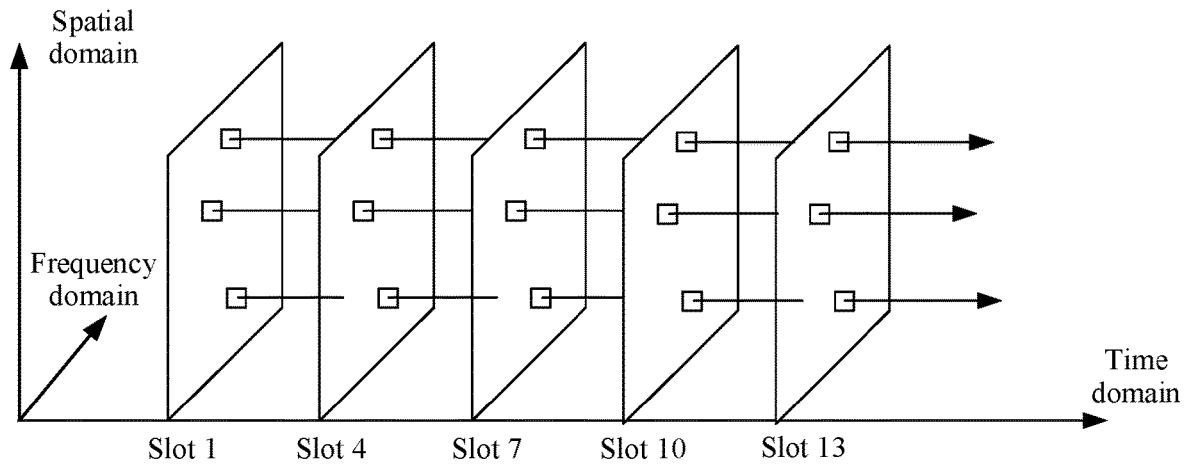
FIG. 5(a) to FIG. 5(c) and FIG. 6 are schematic diagrams of a channel measurement method applicable to an embodiment of this application.
Figure 5B:
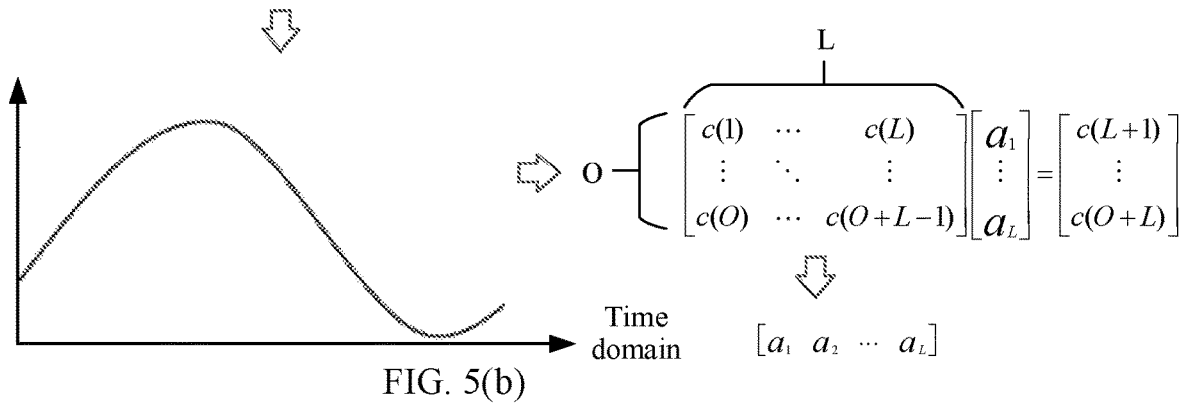

As shown FIG. 5(a), the terminal device may determine a plurality of spatial-frequency vector pairs on a plane including spatial domain and frequency domain. Three spatial-frequency vector pairs (namely, three small squares shown in the figure) are shown in the figure. It is assumed that the terminal device measures channels of five moments: channels in a slot (slot) 1, a slot 4, a slot 7, a slot 10, and a slot 13. The terminal device may report the channels of the five moments to the network device, or the terminal device may report channels of a part of the moments. It is assumed that the terminal device reports channels of four moments to the network device: the channels in the slot 1, the slot 4, the slot 7, and the slot 10.

The foregoing uses an example in which a time interval includes three slots for description. To be specific, a time interval between any two adjacent slots in the slot 1, the slot 4, the slot 7, the slot 10, and the slot 13 includes three slots. It should be understood that the time interval is not limited in this embodiment of this application. For example, the time interval may alternatively include 5 slots, 20 slots, 40 slots, or the like. This is not limited.

The network device may obtain, based on the channel that has been reported by the terminal device and the weighting coefficient, a channel that is not reported by the terminal device. As shown in FIG. 5(b), the network device may obtain the channel of the $5^{th}$ moment (the channel in the slot 13) based on the channels in the slot 1, the slot 4, the slot 7, and the slot 10. In addition, the network device may estimate, based on the channels of the five moments, variation of the time-varying channel, where the variation is represented by using a curve for illustration. Refer to FIG. 5(b).

Figure 5C:
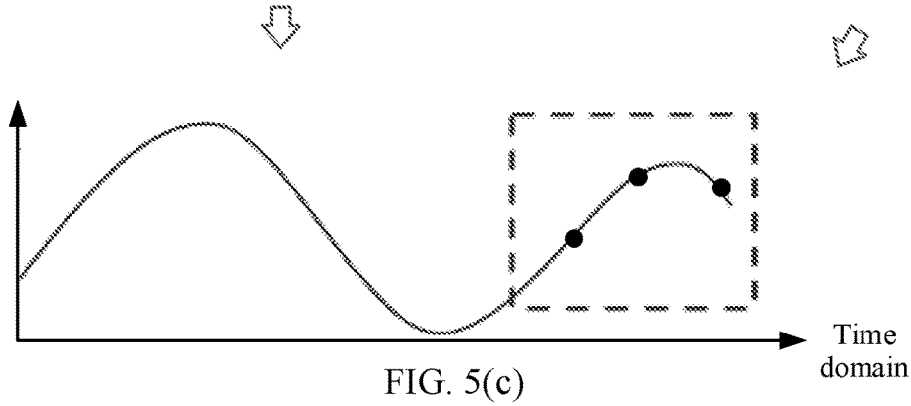

Based on the variation of the channel in time domain together with the weighting coefficient, variation of the channel at a future moment may be predicted, as shown in FIG. 5(c). A curve in a dashed-line box in FIG. 5(c) is a prediction of the channel of the future moment.

It is assumed that the channel of the future moment is denoted as $c(O+L+1)$, which is simply calculated as: $c(O+L+1)=a_1c(O+1)+\ldots+a_Lc(O+L)$. $\{a_1, \ldots, a_L\}$ are the L weighting coefficients, and $c(O+1)$ to $c(O+L)$ are known sampling channels. As shown in FIG. 5(c), the network device predicts channels of three future moments. As shown in FIG. 5(c), the channel of the future moment may be schematically represented by using the curve in the dashed-line box. Three dots on the curve represent the channels of the three future moments predicted by the network device.

It can be learned that the network device may predict the channel of the future moment based on the L weighting coefficients reported by the terminal device.

The following describes in detail a manner in which the terminal device calculates the weighting coefficient.

Optionally, the terminal device may calculate the weighting coefficient based on results of a plurality of times of channel measurement.

In other words, the terminal device may calculate the weighting coefficient based on channels of a plurality of moments. In other words, the terminal device may measure channels at a plurality of moments, and calculate the weighting coefficient based on the measured channels.

Because of the time-varying feature of the channel, the terminal device may perform channel measurement based on reference signals received at a plurality of different moments. In other words, the weighting coefficient may be determined by the terminal device based on the reference signals received at the plurality of moments. In other words, the weighting coefficient may be determined by the terminal device based on the plurality of received reference signals.

In an implementation, the terminal device may calculate the weighting coefficient based on a reference signal received in a measurement window (or referred to as a time-domain measurement window). It should be understood that, measurement duration of the measurement window may be relatively short. For example, the measurement duration may be measured in slots (slot) or milliseconds (ms). For example, the measurement duration of the measurement window is 20 slots, 5 ms, 10 ms, or 20 ms. Alternatively, the measurement duration of the measurement window may be relatively long. For example, the measurement duration may be measured in seconds. For example, the measurement duration is 10 seconds.

The measurement duration may be predefined, for example, defined in a protocol. Alternatively, the measurement window may be preconfigured by the network device. For example, the network device indicates a measurement start moment and the measurement duration using signaling. This is not limited in this application.

In another implementation, the terminal device may receive a reference signal based on a quantity of pilot transmissions, and calculate the weighting coefficient based on the received reference signal.

The quantity of pilot transmissions may be predefined, for example, defined in a protocol. Alternatively, the quantity of pilot transmissions may be preconfigured by the network device. For example, the network device indicates the quantity of pilot transmissions using signaling. This is not limited in this application.

The measurement window and the quantity of pilot transmissions have been described in detail above. For brevity, details are not described herein again.

It should be noted that, in this embodiment of this application, the terminal device may receive the reference signal based on the measurement window or the quantity of pilot transmissions, to perform channel measurement.

Regardless of whether the terminal device receives the reference signal based on the measurement window or receives the reference signal based on the quantity of pilot transmissions, the terminal device may perform channel measurement based on reference signals received a plurality of times, to determine the weighting coefficient used to indicate the time-varying feature of the channel.

For ease of description below, it is assumed that the terminal device determines the L weighting coefficients based on reference signals received N times, where N is an integer greater than or equal to 1, and N is greater than or equal to L. N may be a quantity of times of receiving the reference signals in the measurement window, that is, N is a quantity of times of receiving the reference signals based on the measurement window. Alternatively, N may be a quantity of pilot transmissions, that is, N is a quantity of times of receiving reference signals based on the quantity of pilot transmissions. This is not limited in this application.

For example, the terminal device may calculate the weighting coefficient based on P measurement channels.

The P measurement channels, also referred to as P sampling channels, are channels obtained by the terminal device through measurement at P moments, or channels obtained by the terminal device through sampling at P moments. P is an integer greater than or equal to 1.

The P measurement channels may be, for example, historically measured channels. The terminal device may calculate the weighting coefficient based on a previously measured channel.

Alternatively, the P measurement channels may be, for example, channels currently measured by the terminal device. The terminal device may first perform channel measurement, and calculate the weighting coefficient based on a result of the channel measurement. The measurement channel used by the terminal device to calculate the weighting coefficient may be a part of channels measured by the terminal device. That is, N is greater than or equal to P. For example, in FIG. 5(a) to FIG. 5(c), the terminal device performs channel measurement for N times, and the terminal device may select (O+L) measurement channels measured in the N times, to calculate the L weighting coefficients: $\{a_1, \ldots, a_L\}$. As shown in FIG. 5(a) to FIG. 5(c), the P measurement channels may include $c(1), c(2), \ldots,$ and $c(O+L)$.

It should be understood that the P measurement channels used by the terminal device to calculate the weighting coefficient may be historical measurement results of the terminal device, or may be current measurement results of the terminal device. This is not limited. For ease of understanding, the following mainly uses the example for description in which the P measurement channels are channels currently measured by the terminal device.

Optionally, P may be equal to (O+L). O is an integer greater than or equal to 1.

O may represent a quantity of equations used to calculate the L weighting coefficients. In other words, the terminal device may calculate the L weighting coefficients using O groups of channels. O may be greater than or equal to L, or O may be less than L. This is not limited.

Figure 6:
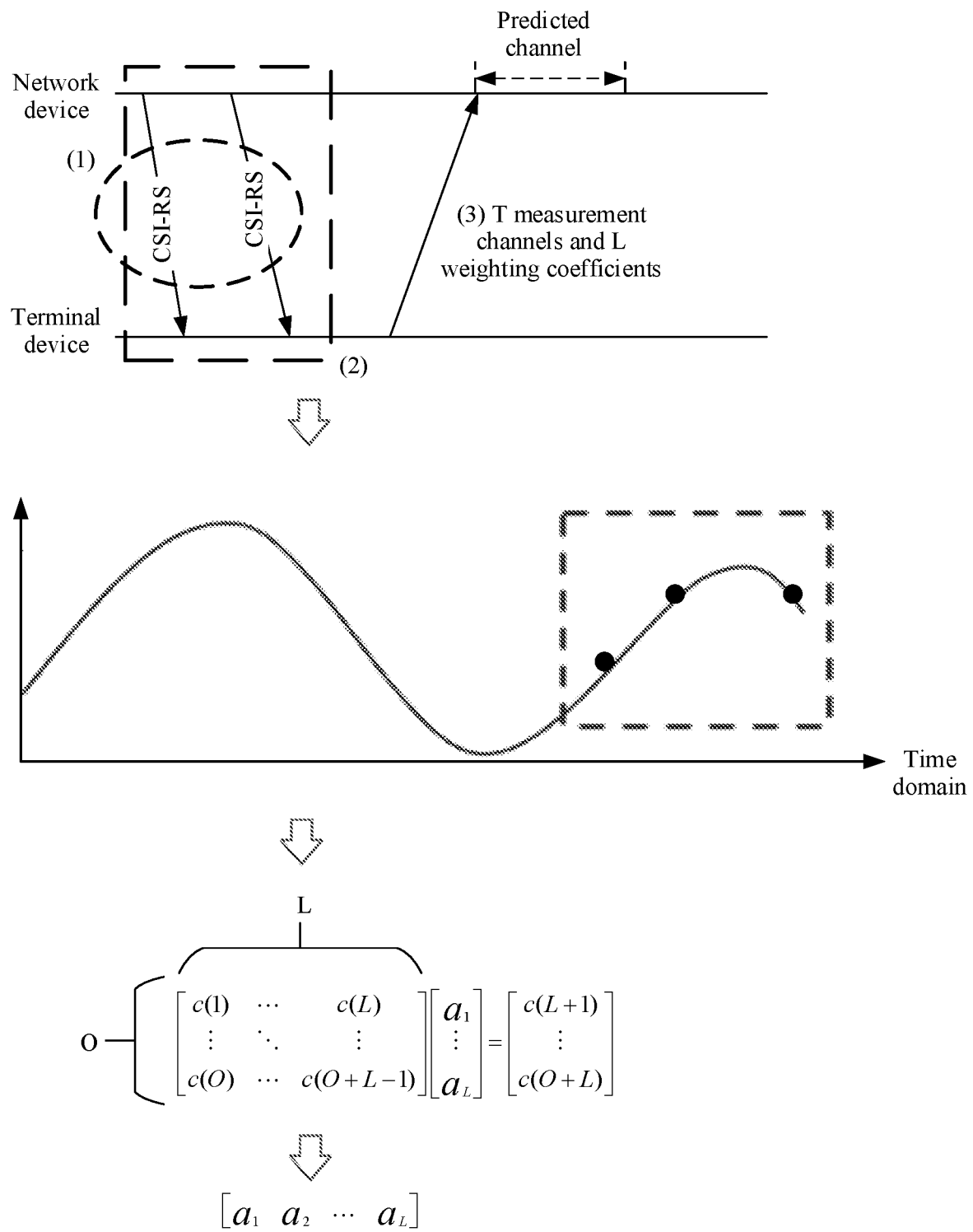

For ease of understanding, with reference to FIG. 6, an example in which P is (O+L) is used to describe a manner in which the terminal device calculates the L weighting coefficients using the O groups of channels.

(1) The Network Device Sends a Reference Signal, for Example, a CSI-RS, to the Terminal Device.

Optionally, the network device configures, for the terminal device, a quantity of CSI-RS measurements and/or a measurement window, and sends the reference signal, for example, the CSI-RS, to the terminal device. For example, the terminal device performs channel estimation in the measurement window and obtains spatial-frequency matrices of (O+L) moments. For example, the spatial-frequency matrices are denoted as H(1), H(2), . . . , H(O+L).

The terminal device may perform channel measurement based on a reference signal received at the $n^{th}$ time in the N times, to obtain a spatial-frequency matrix H(n), where n is an integer greater than or equal to 1, and n is less than or equal to N. The spatial-frequency matrix may be understood as a representation of the channel.

H(n) may represent a matrix with $N_s \times N_3$ dimensions, where $N_s$ may be a quantity of transmit antennas of the network device, and $N_3$ may be a frequency-domain granularity, for example, a quantity of subbands or a quantity of subcarriers.

Optionally, H(n) is projected into spatial-frequency domain, to obtain a corresponding spatial-frequency coefficient matrix C(n): $C(n)=S^H H(n)F$. The C(n) may also be understood as a representation of the channel. S represents a spatial domain base vector set, and F represents a frequency domain base vector set. For example, S may be an $N_s \times N_s$ DFT matrix, and F may be an $N_3 \times N_3$ DFT matrix. C(n) may be a matrix with $N_s \times N_3$ dimensions.

In this application, the upper character H represents a conjugate transpose. For example, $S^H$ represents a conjugate transpose of a matrix (or vector) S. For brevity, descriptions about same or similar cases are omitted below.

It should be understood that the spatial-frequency matrix H(n) or the spatial-frequency coefficient matrix C(n) is used to represent a channel, and this is merely an example for description. This embodiment of this application is not limited thereto. Other manners that can represent the channel all fall within the protection scope of this embodiment of this application.

(2) The terminal device calculates the weighting coefficient.

For ease of understanding and description, the following uses an angle-delay pair as an example.

Implementation 1: The terminal device calculates the weighting coefficient based on C(n).

For a spatial-frequency pair (s, f), the terminal device may obtain a time domain vector that is of a spatial-frequency coefficient of the spatial-frequency pair and that is measured at a plurality of moments: $C^{s,f}$=[c(1), c(2), . . . , c(O+L)], where $C^{s,f}$ may be a vector of 1×(O+L), and c(1), c(2), . . . , and c(O+L) are elements in C(n).

The time domain vector [c(1), c(2), . . . , c(O+L)] of the spatial-frequency coefficient may be represented as an equation of L unknown numbers, and the L weighting coefficients a={$a_1$, . . . , $a_L$} are obtained.

It is assumed that measurement channels (or sampling channels) of (O+L) moments are: c(1), c(2), . . . , and c(O+L). According to the AR model, the following equation may be represented:

$$\begin{bmatrix} c(1) & \cdots & c(L) \\ \vdots & \ddots & \vdots \\ c(O) & \cdots & c(O+L-1) \end{bmatrix} \begin{bmatrix} a_1 \\ \vdots \\ a_L \end{bmatrix} = \begin{bmatrix} c(L+1) \\ \vdots \\ c(O+L) \end{bmatrix}$$

{$a_1$, . . . , $a_L$} are the L weighting coefficients, and c(1) to c(O+L) are all known measurement channels (or known sampling channels).

The equation may be simply understood as that any $(L+1)^{th}$ channel may be represented as a weighted sum of the weighting coefficients {$a_1$, . . . , $a_L$}) of the first L channels.

a can be calculated according to $a=X^{-1}Y$. X is $$\begin{bmatrix} c(1) & \cdots & c(L) \\ \vdots & \ddots & \vdots \\ c(O) & \cdots & c(O+L-1) \end{bmatrix},$$

Y is $$\begin{bmatrix} c(L+1) \\ \vdots \\ c(O+L) \end{bmatrix}, \text{ and a is } \begin{bmatrix} a_1 \\ \vdots \\ a_L \end{bmatrix}.$$

The L weighting coefficients a={$a_1$, . . . , $a_L$} can be calculated according to O equations (or O groups of measurement channels). The weighting coefficients {$a_1$, . . . , $a_L$} can be more robust by using the O equations.

It should be understood that the foregoing formula is merely an example for description, and this embodiment of this application is not limited thereto. Any variation of the formula falls within the protection scope of this embodiment of this application.

Implementation 2: The terminal device calculates the weighting coefficient based on H(n).

It is assumed that spatial-frequency matrices obtained through measurement at (O+L) moments are: H(1), H(2), . . . , and H(O+L). According to the AR model, the following equation may be represented:

$$\begin{bmatrix} H(1) & \cdots & H(L) \\ \vdots & \ddots & \vdots \\ H(O) & \cdots & H(O+L-1) \end{bmatrix} \begin{bmatrix} a_1 \\ \vdots \\ a_L \end{bmatrix} = \begin{bmatrix} H(L+1) \\ \vdots \\ H(O+L) \end{bmatrix}$$

{$a_1$, . . . , $a_L$} are the L weighting coefficients, and H(1) to H(O+L) are all known measurement channels (or known sampling channels, namely, spatial-frequency matrices obtained through channel measurement).

It should be understood that, in the foregoing formula, a start location of each row may be independent, provided that spacings between Hs in all rows are aligned, that is, time intervals are the same. For example, there are three rows. The $1^{st}$ row may be H(1), H(2), and H(3), where a start location of the $1^{st}$ row may be H(1). The $2^{nd}$ row may be H(4), H(5), and H(6), where a start location of the $2^{nd}$ row may be H(4). The $3^{rd}$ row may be H(2), H(3), and H(4), where a start location of the $3^{rd}$ row may be H(2).

a can be calculated according to $a=X^1Y$. X is $$\begin{bmatrix} H(1) & \cdots & H(L) \\ \vdots & \ddots & \vdots \\ H(O) & \cdots & H(O+L-1) \end{bmatrix},$$

Y is $$\begin{bmatrix} H(L+1) \\ \vdots \\ H(O+L) \end{bmatrix},$$

and a is $$\begin{bmatrix} a_1 \\ \vdots \\ a_L \end{bmatrix}.$$

For example, a may be a least squares solution of the foregoing equation.

It should be understood that the foregoing formula is merely an example for description, and this embodiment of this application is not limited thereto. Any variation of the formula falls within the protection scope of this embodiment of this application.

It should be further understood that C(n) and H(n) are used as examples for description. This is not limited in this embodiment of this application. Any manner in which a channel can be represented falls within the protection scope of this embodiment of this application.

It should be further understood that a receive antenna is not limited in this embodiment of this application. This embodiment of this application is mainly described by using one receive antenna as an example. When there are a plurality of receive antennas, at least the following cases may be included.

1. Calculate a group of weighting coefficients for each receive antenna.

It may be understood that each receive antenna may correspond to a group of weighting coefficients.

For example, a spatial-frequency matrix corresponding to each receive antenna may be used to calculate a group of weighting coefficients. For another example, a spatial-frequency coefficient matrix corresponding to each receive antenna (namely, a spatial-frequency coefficient matrix obtained by projecting a spatial-frequency matrix into spatial-frequency domain) may be used to calculate a group of weighting coefficients.

2. Calculate a group of weighting coefficients for a plurality of receive antennas, where the group of weighting coefficients may be used for the plurality of receive antennas.

It may be understood that the plurality of receive antennas may correspond to the same group of weighting coefficients.

For example, a group of weighting coefficients may be calculated for any one of the receive antennas, where the group of weighting coefficients may be used for the plurality of receive antennas.

For another example, a spatial-frequency matrix corresponding to any selected receive antenna to calculate a group of weighting coefficients. Alternatively, a spatial-frequency coefficient matrix corresponding to any selected receive antenna (namely, a spatial-frequency coefficient matrix obtained by projecting a spatial-frequency matrix into spatial-frequency domain) may be used to calculate a group of weighting coefficients.

For another example, a plurality of spatial-frequency coefficients may be obtained for a plurality of receive antennas. Any part of the plurality of spatial-frequency coefficients is selected to calculate a group of weighting coefficients, where the group of weighting coefficients may be used for the plurality of receive antennas.

For example, D1 spatial-frequency coefficients are obtained from a first receive antenna, where the D1 spatial-frequency coefficients and the L weighting coefficients form O1 equations; D2 spatial-frequency coefficients are obtained from a second receive antenna, where the D2 spatial-frequency coefficients and the L weighting coefficients form O2 equations; D3 spatial-frequency coefficients are obtained from a third receive antenna, where the D3 spatial-frequency coefficients and the L weighting coefficients form O3 equations; . . . ; and Dr spatial-frequency coefficients are obtained from an $r^{th}$ receive antenna, where the Dr spatial-frequency coefficients and the L weighting coefficients form Or equations.

r represents a quantity of receive antennas. D1, D2, D3, . . . , and Dr are integers greater than or equal to 1, and represent quantities of spatial-frequency coefficients obtained from different receive antennas. O1, O2, O3, . . . , and Or are integers greater than or equal to 1, and represent quantities of equations. Optionally, O1, O2, O3, . . . , and Or are equal.

The L weighting coefficients may be calculated according to an equation set including the O1 equations, the O2 equations, the O3 equations, . . . , and the Or equations.

For an equation formed by the spatial-frequency coefficient and the L weighting coefficients, refer to the descriptions in the foregoing implementation 1. Details are not described herein again.

It should be understood that specific spatial-frequency coefficients that are obtained from different receive antennas are not limited in this embodiment of this application.

It should be further understood that the first receive antenna, the second receive antenna, and the third receive antenna are merely names for distinguishing between different receive antennas, and do not limit the protection scope of this embodiment of this application.

For another example, singular value decomposition (singular value decomposition, SVD) may be performed on a plurality of spatial-frequency coefficients corresponding to a plurality of receive antennas or a part of a plurality of spatial-frequency coefficients corresponding to a plurality of receive antennas, and a feature vector is obtained, to be used to calculate the weighting coefficient. For example, the spatial-frequency coefficients or the part of the spatial-frequency coefficients corresponding to the plurality of receive antennas are combined into a matrix, and singular value decomposition is performed on the matrix. Then a feature vector is obtained, to be used to calculate the weighting coefficient.

For another example, a plurality of spatial-frequency matrices may be obtained for a plurality of receive antennas. SVD is performed on the plurality of spatial-frequency matrices or a part of the plurality of spatial-frequency matrices, and then a feature vector is obtained, to be used to calculate the weighting coefficient. For example, the plurality of spatial-frequency matrices or the part of the plurality of spatial-frequency matrices corresponding to the plurality of receive antennas are combined into a matrix, and singular value decomposition is performed on the matrix. Then a feature vector is obtained, to be used to calculate the weighting array.

It should be understood that a same group of weighting coefficients corresponding to a plurality of receive antennas may be obtained in a plurality of implementations. The foregoing provides only two possible example manners. This is not limited in this embodiment of this application.

It should be further understood that the foregoing two cases for a plurality of receive antennas are merely examples for description, and this embodiment of this application is not limited thereto.

It should be further understood that a quantity of receive antennas is not limited in this embodiment of this application.

After calculating the L weighting coefficients, the terminal device may report the L weighting coefficients to the network device.

Optionally, the terminal device may further report information about T measurement channels to the network device. T is an integer greater than or equal to 1.

(3) The terminal device reports the T measurement channels and the L weighting coefficients.

A specific reporting quantization manner is not limited in this embodiment of this application. The L weighting coefficients and the information about the T measurement channels may be included in one piece of information. For example, the terminal device may report the L weighting coefficients and the information about the T measurement channels via one piece of uplink control information (uplink control information, UCI). Alternatively, the L weighting coefficients and the information about the T measurement channels may be separately reported. For example, the terminal device may separately report the L weighting coefficients and the information about the T measurement channels. This is not limited.

The terminal device reports the information about the T measurement channels, where T is greater than or equal to L, so that the network device obtains information about an unknown channel based on L measurement channels in the T measurement channels and the L weighting coefficients reported by the terminal device.

Information about a measurement channel may include channel information and/or a sequence number in time.

The sequence number in time may indicate a moment at which the channel is measured, a sequence number for measuring the channel, or a sequence number of the measurement channel. For example, the terminal device reports, to the network device, a channel obtained through measurement at a moment 1, and a moment at which the terminal device may report the channel to the network device is the moment 1. For another example, the terminal device reports, to the network device, a channel obtained through the $n^{th}$ measurement in a measurement window, and the terminal device may report the channel to the network device at the $n^{th}$ reporting. A sequence of measurement channels is described below.

It should be understood that the information about the measurement channel may further include other information. This is not limited.

The following describes the T measurement channels reported by the terminal device in different cases.

Case 1: T may be equal to N.

In other words, the terminal device may report, to the network device, channels obtained through measurement at all moments. In this case, the network device may predict a channel of a future moment based on the measurement channels and the weighting coefficients reported by the terminal device.

Case 2: T may be less than N.

To be specific, the terminal device may report a part of channels obtained through measurement. In other words, the terminal device may report channels obtained through measurement at a part of moments, without reporting all the channels obtained through measurement. This can reduce reporting overheads. In this case, based on the measurement channels and the weighting coefficients reported by the terminal device, the network device can predict a channel of a future moment, and obtain a channel that has been measured by the terminal device but is not reported.

It is assumed that the terminal device measures channels of five moments: channels in a slot 1, a slot 4, a slot 7, a slot 10, and a slot 13. The terminal device may alternatively report channels of a part of moments. For example, the terminal device reports channels of four moments to the network device.

For example, as described in step 410, the L weighting coefficients may be used to determine the channels of the K moments based on the channels of the M moments, where the M moments may be before the K moments.

For example, the terminal device may report the channels obtained through measurement in the slot 1, the slot 4, the slot 7, and the slot 10. The network device may obtain, based on the weighting coefficients reported by the terminal device and the channels obtained through measurement in the slot 1, the slot 4, the slot 7, and the slot 10, the channel obtained through measurement in the slot 13. The channels of the M moments may include the channels in the slot 1, the slot 4, the slot 7, and the slot 10. The channels of the K moments may include the channel in the slot 13.

For another example, the terminal device may report the channels obtained through measurement in the slot 1, the slot 4, the slot 7, and the slot 10. Based on the weighting coefficients reported by the terminal device and the channels obtained through measurement in the slot 1, the slot 4, the slot 7, and the slot 10, the network device can obtain the channel obtained through measurement in the slot 13, and also predict a channel after the slot 13. The channels of the M moments may include the channels in the slot 1, the slot 4, the slot 7, and the slot 10. The channels of the K moments may include the channel in the slot 13 and the channel after the slot 13.

For another example, as described in step 410, the L weighting coefficients may be used to determine the channels of the K moments based on the channels of the M moments, where the M moments may be after the K moments.

For example, the terminal device may report the channels obtained through measurement in the slot 4, the slot 7, the slot 10, and the slot 13. The network device may obtain, based on the weighting coefficients reported by the terminal device and the channels obtained through measurement in the slot 4, the slot 7, the slot 10, and the slot 13, the channel obtained through measurement in the slot 1. The channels of the M moments may include the channels in the slot 4, the slot 7, the slot 10, and the slot 13. The channels of the K moments may include the channel in the slot 1.

In the case 1 and the case 2, N and T are compared, where N and T respectively represent the quantity (N) of channels measured by the terminal device and the quantity (T) of measurement channels reported by the terminal device, and descriptions are provided that the quantity of measurement channels reported by the terminal device may be less than the quantity of channels actually measured by the terminal device. Therefore, reporting overheads can be reduced.

With reference to a case 3 and a case 4, the following compares L and T, which respectively represent the quantity (L) of weighting coefficients calculated by the terminal device and the quantity (T) of measurement channels reported by the terminal device.

Case 3: T may be greater than L.

In this case, a time interval between any two adjacent channels in at least L measurement channels in the T measurement channels is the same as a time interval between any two adjacent channels in the measurement channels used to calculate the L weighting coefficients.

For example, in the foregoing implementation 1, the terminal device calculates the L weighting coefficients using the (O+L) channels. It is assumed that time intervals of the (O+L) channels are x, where x is greater than 0. For example, the terminal device obtains c(1) through measurement at a moment t1, obtains c(2) through measurement at a moment (t1+x), obtains c(3) through measurement at a moment (t1+2x), and the like. In this case, in the T measurement channels reported by the terminal device, the time interval of the at least L measurement channels is x, so that the network device can learn of accurate channel information based on the L measurement channels and the L weighting coefficients. This ensures communication performance.

Case 4: T may be equal to L.

In other words, the terminal device may report the L measurement channels and the L weighting coefficients: $a_1, \ldots, a_L$. In this case, the L measurement channels reported by the terminal device may be any L measurement channels used to calculate the L weighting coefficients.

An angle-delay pair is used as an example.

It is assumed that the terminal device calculates the weighting coefficient in the foregoing implementation 1.

Optionally, the terminal device may report any group of L measurement channels.

For example, the terminal device may report the first L measurement channels: c(1), c(2), . . . , and c(L).

For another example, the terminal device may report the last L measurement channels: c(O+1), c(O+2), . . . , and c(O+L).

For another example, the terminal device may report any L measurement channels in the middle.

The any L measurement channels in the middle may be any continuous measurement channels or discontinuous measurement channels, provided that a time interval between any two adjacent channels in the any L measurement channels in the middle is the same as the time interval between any two adjacent channels in the P measurement channels used to calculate the weighting coefficient. If the terminal device calculates the weighting coefficient using c(1), c(3), c(5), . . . , the L measurement channels reported by the terminal device may be c(1), c(3), c(5), . . . or may be c(2), c(4), c(6), . . . .

A plurality of angle-delay pairs are used as an example.

For example, each angle-delay pair may correspond to a group of weighting coefficients, that is, each angle-delay pair has independent weighting coefficients. The terminal device may separately report the groups of weighting coefficients corresponding to the angle-delay pairs. In other words, the terminal device reports a plurality of groups of weighting coefficients, and each group of weighting coefficients corresponds to an angle-delay pair. Quantities of weighting coefficients in the groups of weighting coefficients may be equal or different. This is not limited.

For another example, the plurality of angle-delay pairs correspond to a same weighting coefficient. The terminal device may report one group of weighting coefficients corresponding to the plurality of angle-delay pairs. In other words, the terminal device reports one group of weighting coefficients, and the group of weighting coefficients corresponds to the plurality of angle-delay pairs.

For another example, the plurality of angle-delay pairs correspond to a plurality of groups of weighting coefficients. In an example of W1 angle-delay pairs, the terminal device may report W2 groups of weighting coefficients, where both W1 and W2 are integers greater than or equal to 2. Each group of weighting coefficients corresponds to a plurality of angle-delay pairs. Alternatively, a part of the W2 groups of weighting coefficients correspond to a plurality of angle-delay pairs, and a part of the W2 groups of weighting coefficients correspond to one angle-delay pair.

It should be understood that the foregoing descriptions are merely an example. The plurality of angle-delay pairs may correspond to one or more groups of weighting coefficients. This is not limited in this embodiment of this application.

Optionally, when reporting the information about the measurement channel, the terminal device may report a sequence number of the measurement channel.

The sequence number of the measurement channel, or referred to as a subscript of the measurement channel, is a name for distinguishing between different measurement channels, or a name for distinguishing between different measurement moments. For example, the terminal device performs channel estimation in a measurement window and obtains channels of (O+L) moments, where the channels may be denoted as H(1), H(2), . . . , and H(O+L). In this case, a sequence number or a subscript of the channel H(1) may be denoted as 1, a sequence number or a subscript of H(2) may be denoted as 2, and the like. For another example, if the terminal device calculates the weighting coefficient using the P measurement channels, sequence numbers or subscripts of the P measurement channels may be sequentially named based on a time sequence of measurement: 1, 2, . . . , and P. For example, the terminal device may report subscripts of the L measurement channels. For example, when reporting the last L measurement channels, the terminal device may report O+1, O+2, . . . , and O+L. For another example, when reporting the first L measurement channels, the terminal device may report 1, 2, . . . , and L.

For another example, the terminal device may report a group sequence number of a measurement channel. For example, when reporting the last L measurement channels, the terminal device may report O (where O corresponds to the $O^{th}$ group). For another example, when reporting the first L measurement channels, the terminal device may report 1 (where 1 corresponds to the $1^{st}$ group).

For another example, the terminal device may report a subscript of the $1^{st}$ measurement channel. For example, when reporting the last L measurement channels, the terminal device may report O (where O corresponds to O to O+L). For another example, when reporting the first L measurement channels, the terminal device may report 1 (where 1 corresponds to 1 to L). For another example, when the terminal device reports the any L measurement channels in the middle, the terminal device may report y (where y corresponds to y to y+L), where y is an integer greater than or equal to 1, and y is less than or equal to O.

For another example, the terminal device may report a subscript of the last measurement channel. For example, when reporting the last L measurement channels, the terminal device may report O+L (where O+L corresponds to O to O+L). For another example, when reporting the first L measurement channels, the terminal device may report L (where L corresponds to 1 to L). For another example, when reporting the any L measurement channels in the middle, the terminal device may report y+L (where y+L corresponds to y to y+L).

Using the foregoing reporting manners can reduce overheads of feeding back the measurement channel by the terminal device.

The foregoing describes the several possible example cases of the measurement channel reported by the terminal device. According to this application, the terminal device may report a part of measurement channels to the network device, so that feedback signaling overheads can be reduced. In addition, based on the weighting coefficient and the measurement channel reported by the terminal device, the network device may further reconstruct channel time-variation, and predict a trend of channel variation, thereby reducing losses caused by CSI expiration, and improving system performance.

It can be learned from the foregoing that the terminal device may calculate the L weighting coefficients using the O groups of channels.

Optionally, the terminal device may first obtain information about the parameter L and information about the parameter O, and calculate L' weighting coefficients based on the parameter L and the parameter O using the O groups of channels, where L' is an integer greater than or equal to 1, and L' is less than or equal to L.

In other words, after the terminal device learns of a value of the parameter L, a quantity of weighting coefficients calculated by the terminal device may be less than L. In other words, the weighting coefficients reported by the terminal device may be less than L. Optionally, the terminal device may calculate the L' weighting coefficients, and report the L' weighting coefficients obtained through calculation.

The parameter L and the parameter O may be combined into $\{L, O\}$. Alternatively, the parameter L and the parameter O may exist independently. The following describes a manner in which the terminal device determines the parameter L and the parameter O.

Optionally, the terminal device may determine a target $\{L, O\}$ from one or more groups of $\{L, O\}$, and may determine values of the parameter L and the parameter O based on the target $\{L, O\}$.

Example 1: The network device configures one group of $\{L, O\}$, and the terminal device determines the values of the parameter L and the parameter O based on the group of $\{L, O\}$ configured by the network device.

It may be understood that the network device configures one group of $\{L, O\}$ for the terminal device, and indicates the configured $\{L, O\}$ to the terminal device. The terminal device may learn of the values of L and O based on the group of $\{L, O\}$ configured by the network device. Further, the terminal device may calculate the L weighting coefficients using the O groups of channels.

Example 2: The network device preconfigures a plurality of groups of $\{L, O\}$ parameter value combinations, or a plurality of groups of $\{L, O\}$ parameter value combinations are pre-specified in a protocol; and the terminal device selects a specific group of $\{L, O\}$, to calculate the weighting coefficient.

The plurality of groups of $\{L, O\}$ may be some dynamically configured values. For example, the network device dynamically configures the plurality of groups of $\{L, O\}$ for the terminal device based on an actual situation.

Alternatively, the plurality of groups of $\{L, O\}$ may be some fixed values. For example, the $\{L, O\}$ parameter may include $\{4, 3\}$, $\{3, 2\}$, $\{4, 2\}$, and the like. This is not limited.

The plurality of groups of $\{L, O\}$ may be preconfigured by the network device or pre-specified in a protocol, so that an appropriate group of $\{L, O\}$ may be selected based on an actual situation, thereby improving prediction accuracy.

Optionally, each of the plurality of groups of $\{L, O\}$ corresponds to a value of one or more of the following: measurement duration, a pilot time-domain density, a quantity of pilot transmissions, and a pilot transmission periodicity. In other words, each of the plurality of groups of $\{L, O\}$ corresponds to a configuration of one or more of the following: the measurement duration, the pilot time-domain density, the quantity of pilot transmissions, and the pilot transmission periodicity.

The terminal device may determine the corresponding group of $\{L, O\}$ based on one or more of the following: the measurement duration, the pilot time-domain density, the quantity of pilot transmissions, and the pilot transmission periodicity.

A specific manner in which the terminal device determines the values of the measurement duration, the pilot time-domain density, the quantity of pilot transmissions, and the pilot transmission periodicity is not limited in this application.

In an implementation, the network device may directly indicate the value of the measurement duration, the pilot time-domain density, the quantity of pilot transmissions, or the pilot transmission periodicity using signaling.

In another implementation, the network device may alternatively indicate, using signaling, a configuration related to the value of the measurement duration, the pilot time-domain density, the quantity of pilot transmissions, or the pilot transmission periodicity. For example, a correspondence between a plurality of configurations and a plurality of values may be predefined in a protocol, and the correspondence may be represented as a table or in another manner. The network device may indicate the value of the measurement duration, the pilot time-domain density, the quantity of pilot transmissions, or the pilot transmission periodicity by indicating a configuration or an index of a configuration corresponding to a value.

In still another implementation, the value of the measurement duration, the pilot time-domain density, the quantity of pilot transmissions, or the pilot transmission periodicity may be predefined, for example, defined in a protocol.

The foregoing lists the several specific implementations of determining the value of the measurement duration, the pilot time-domain density, the quantity of pilot transmissions, or the pilot transmission periodicity. However, this shall not constitute any limitation on this application.

Optionally, each of the plurality of groups of $\{L, O\}$ corresponds to a value of a moving speed. In other words, each of the plurality of groups of $\{L, O\}$ corresponds to a value range of the moving speed.

For example, it is assumed that there are four value ranges for the moving speed, which are denoted as a first value range, a second value range, a third value range, and a fourth value range. Each value range corresponds to a group of $\{L, O\}$.

The terminal device may determine, based on a specific value range in which the movement rate falls, a corresponding group of $\{L, O\}$.

A plurality of groups of $\{L, O\}$ are preconfigured by the network device, or pre-specified in a protocol, so that the terminal device can obtain a more accurate weighting coefficient. In addition, bounding $\{L, O\}$ to a measurement periodicity, the quantity of pilot transmissions, and the pilot time-domain density can reduce signaling overheads. Alternatively, bounding the $\{L, O\}$ to the moving speed can improve accuracy of calculating the weighting coefficient, and reduce signaling overheads.

Optionally, the terminal device may alternatively report an index of a selected group of {L, O}. In other words, the terminal device may report an index of the target {L, O}.

In addition, as described above, the terminal device may actually report L' weighting coefficients, where L' is less than L.

Example 3: The network device configures a plurality of groups of {L, O} using RRC, and activates a {L, O} combination using a media access control control element (media access control control element, MAC CE) or downlink control information (downlink control information, DCI).

For example, the network device may indicate an index of the activated {L, O} to the terminal device using the MAC CE or the DCI.

Example 4: The network device configures a plurality of groups of {L, O} using RRC, configures an optional {L, O} subset by using a MAC CE, and selects a {L, O} combination using DCI.

For example, the network device may indicate an index of the activated {L, O} to the terminal device using DCI.

In the foregoing examples, it is described that the parameter L and the parameter O exist in a combined form, namely, {L, O}. The terminal device may select a group of {L, O} to determine the values of the parameter L and the parameter O.

The following describes, with reference to several examples, the case in which the parameter L and the parameter O exist independently.

Example 5: The network device indicates the value of the parameter L to the terminal device, and the terminal device determines the value of the parameter O based on the value of the parameter L.

A relationship between the parameter L and the parameter O, for example, a ratio of L to O, may be specified by default or specified in advance. The terminal device may determine the value of O based on the value of L and the relationship between the parameter L and the parameter O.

For example, if the value of L is equal to the value of O, the terminal device may determine the value of O based on the value of L.

Example 6: The network device indicates the value of the parameter O to the terminal device, and the terminal device determines the value of the parameter L based on the value of the parameter O.

A relationship between the parameter L and the parameter O, for example, a ratio of L to O, may be specified by default or specified in advance. The terminal device may determine the value of L based on the value of O and the relationship between the parameter L and the parameter O.

For example, if the value of L is equal to the value of O, the terminal device may determine the value of L based on the value of O.

Example 7: The network device indicates a value of W to the terminal device, and the terminal device determines the values of the parameter L and the parameter 0 based on the value of W and a relationship between O and L.

In this example, (O+L) may be considered as one parameter. For differentiation, (O+L) is denoted as W, where W is equal to (O+L). In other words, the network device may configure one or more Ws for the terminal device, or one or more Ws are pre-specified in a protocol.

In this example, the relationship between O and L may be pre-specified. For example, O is equal to L, or a ratio of O to L is a fixed value. The terminal device may determine the values of O and L based on W and the relationship between O and L.

The foregoing examples describe several manners in which the terminal device obtains the parameter L and the parameter O. This is not limited in this embodiment of this application.

For example, for the foregoing case in which the equations O1, O2, O3, . . . , and Or are used, O1, O2, O3, . . . , and Or may also be used as a group of parameters.

For example, one or more groups of values of O1, O2, O3, . . . , and Or may be preconfigured by the network device or pre-specified in a protocol. For example, the terminal device may determine a group of O1, O2, O3, . . . , and Or.

For example, a value of Oi may be preconfigured by the network device or pre-specified in a protocol. The terminal device may determine the remaining value based on the value of Oi, where Oi is any one of O1, O2, O3, . . . , and Or. For example, assuming that O1, O2, O3, . . . , and Or are equal, a value of O1 may be preconfigured by the network device or pre-specified in a protocol, and the terminal device may determine values of O2, O3, . . . , and Or based on the value of O1.

In this application, the terminal device reports the weighting coefficient, so that the network device can reconstruct channel time-variation, and predict a trend of channel variation. The network device can not only learn of a channel status more comprehensively, to make a more reasonable decision for downlink scheduling, but also reduce performance losses caused by CSI expiration, to improve system performance. Reporting the weighting coefficient by the terminal device can reduce CSI reporting overheads and save resources.

In addition, in this application, the terminal device may report a part of the measurement channels by reporting the weighting coefficient, that is, report a part of the channels obtained through measurement. The network device may learn of, based on the reported weighting coefficient and the part of the measurement channels, a measurement channel that is not reported by the terminal device. In this way, reporting overheads can be reduced.

In addition, in this application, one or more groups of {L, O} value combinations may be preconfigured by the network device or pre-specified in a protocol, so that the terminal device may select an appropriate group of {L, O} based on an actual situation, thereby improving prediction accuracy.

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

The foregoing describes in detail the methods provided in embodiments of this application with reference to FIG. 4 to FIG. 6. The following describes in detail communication apparatuses provided in embodiments of this application with reference to FIG. 7 to FIG. 10. It should be understood that descriptions of the apparatus embodiments correspond to the descriptions of the method embodiments. Therefore, for content not described in detail, refer to the foregoing method embodiments. For brevity, details are not described herein again.

The foregoing mainly describes the solutions provided in embodiments of this application from the perspective of interaction between network elements. It may be understood that, to implement the foregoing functions, each network element, such as a transmit-end device or a receive-end device, includes a corresponding hardware structure and/or software module for performing each function. A person skilled in the art may be aware that, with reference to the examples described in embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the transmit-end device or the receive-end device may be divided based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that in embodiments of this application, division into the modules is merely example logical function division, and may be other division in an actual implementation. The following uses an example in which each functional module is obtained through division based on a corresponding function for description.

Figure 7:
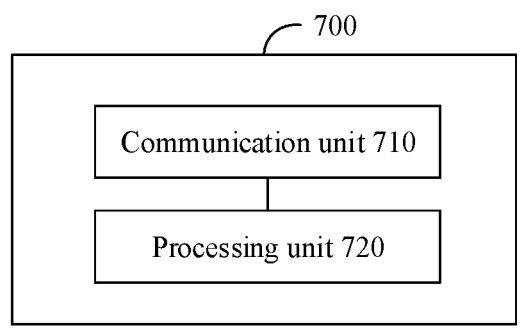
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 700 may include a communication unit 710 and a processing unit 720. The communication unit 710 may communicate with the outside, and the processing unit 720 is configured to process data. The communication unit 710 may also be referred to as a communication interface or a transceiver unit. The communication interface is configured to input and/or output information, where the information includes at least one of data and instructions. Optionally, the communication apparatus may be a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In a possible design, the communication apparatus 700 may implement the steps or the procedure performed by the terminal device in the foregoing method embodiments. The communication apparatus 700 may be, for example, the terminal device, or a chip, a circuit, or a chip system configured in the terminal device. In this case, the communication apparatus 700 may be referred to as a terminal device. The communication unit 710 is configured to perform a sending/receiving-related operation on the terminal device side in the foregoing method embodiments, and the processing unit 720 is configured to perform a processing-related operation of the terminal device in the foregoing method embodiments.

In a possible implementation, the processing unit 720 is configured to determine L weighting coefficients, where the L weighting coefficients may be used to determine channels of K moments based on channels of M moments, and L, M, and K are all integers greater than or equal to 1; and the communication unit 710 is configured to send information about the L weighting coefficients.

Optionally, the communication unit 710 is further configured to send information about T measurement channels, where the T measurement channels are any one of the following: any T measurement channels in N times of channel measurements, the first T measurement channels in the N times of channel measurements, and the last T measurement channels in the N times of channel measurements, where both N and T are integers greater than or equal to 1, and T is greater than or equal to L.

Optionally, the processing unit 720 is specifically configured to calculate the L weighting coefficients based on P measurement channels, where P is an integer greater than or equal to 1, and is greater than or equal to L.

Optionally, a time interval between any two adjacent channels in the P measurement channels is the same as a time interval between any two adjacent channels in at least L measurement channels in the T measurement channels.

Optionally, the processing unit 720 is further configured to obtain information about the parameter L and information about a parameter O. The processing unit 720 is specifically configured to calculate L' weighting coefficients based on the parameter L and the parameter O using O groups of channels, where both O and L' are integers greater than or equal to 1, and L' is less than or equal to L. The communication unit 710 is specifically configured to send information about the L' weighting coefficients.

Optionally, the processing unit 720 is further configured to determine a target {L, O} from one or more groups of {L, O}; and determine a value of the parameter L and a value of the parameter O based on the target {L, O}.

Optionally, each of the one or more groups of {L, O} corresponds to one or more of the following information: measurement duration, a pilot time-domain density, a quantity of pilot transmissions, a pilot transmission periodicity, and a moving speed.

Optionally, the communication unit 710 is further configured to send indication information, where the indication information is used to indicate an index of the target {L, O}.

The communication apparatus 700 may implement the steps or the procedure performed by the terminal device in the method 400 in embodiments of this application. The communication apparatus 700 may include the units configured to perform the method performed by the terminal device in the method 400 in FIG. 4. In addition, the units in the communication apparatus 700 and the foregoing other operations and/or functions are separately used to implement corresponding procedures of the method 400 in FIG. 4.

When the communication apparatus 700 is configured to perform the method 400 in FIG. 4, the communication unit 710 may be configured to perform step 420 in the method 400, and the processing unit 720 may be configured to perform step 410 in the method 400.

It should be understood that, a specific process in which each unit performs the foregoing corresponding step has been described in detail in the foregoing method embodiments. For brevity, details are not described herein again.

Figure 9:
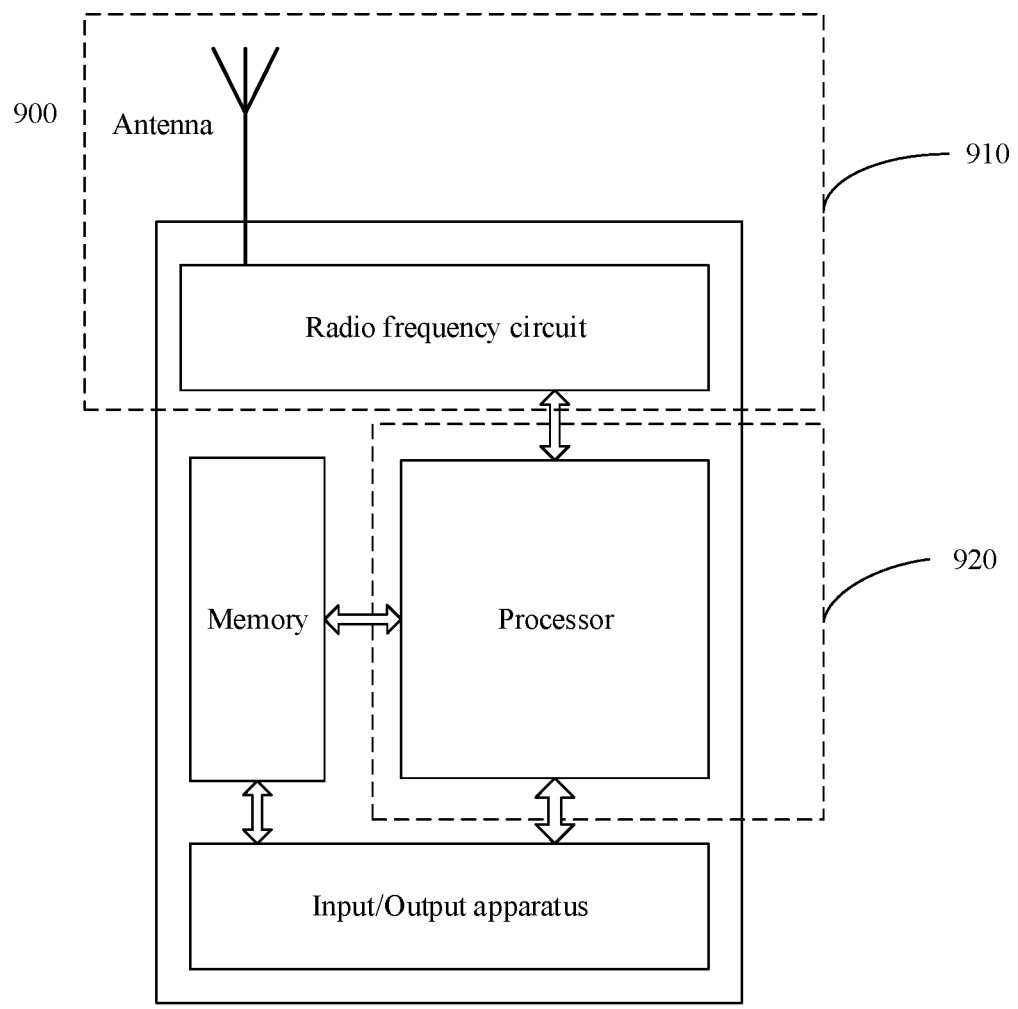
FIG. 9 is a schematic diagram of a structure of a terminal device according to an embodiment of this application.

It should be further understood that the communication unit 710 in the communication apparatus 700 may be implemented by using a transceiver 910 in a terminal device 900 shown in FIG. 9, and the processing unit 720 in the communication apparatus 700 may be implemented by using a processor 920 in the terminal device 900 shown in FIG. 9. The transceiver may include a transmitter and/or a receiver, to respectively implement functions of a sending unit and a receiving unit.

It should be further understood that the communication unit 710 in the communication apparatus 700 may alternatively be an input/output interface.

In another possible design, the communication apparatus 700 may implement the steps or the procedure performed by the network device in the foregoing method embodiments. The communication apparatus 700 may be, for example, the network device, or a chip, a circuit, or a chip system configured in the network device. In this case, the communication apparatus 700 may be referred to as a network device. The communication unit 710 is configured to perform a sending/receiving-related operation on the network device side in the foregoing method embodiments. The processing unit 720 is configured to perform a processing-related operation of the network device in the foregoing method embodiments.

In a possible implementation, the communication unit 710 is configured to receive information about L weighting coefficients, where the L weighting coefficients are used to determine channels of K moments based on channels of M moments, and L, M, and K are all integers greater than or equal to 1; and the processing unit 720 is configured to determine the L weighting coefficients.

Optionally, the communication unit 710 is further configured to receive information about T measurement channels. The T measurement channels are any one of the following: any T measurement channels in N times of channel measurements, the first T measurement channels in the N times of channel measurements, and the last T measurement channels in the N times of channel measurements, where both N and T are integers greater than or equal to 1, and T is greater than or equal to L.

Optionally, the communication unit 710 is further configured to send information indicating a parameter O and the parameter L. The communication unit 710 is specifically configured to receive information about L' weighting coefficients, where the L' weighting coefficients are calculated based on the parameter O and the parameter L using O groups of channels, and both O and L' are integers greater than or equal to 1, and L' is less than or equal to L.

Optionally, the communication unit 710 is further configured to send information indicating one or more groups of {L, O}, where the one or more groups of {L, O} are used to determine a value of the parameter L and a value of the parameter O.

Optionally, each of the one or more groups of {L, O} corresponds to one or more of the following information: measurement duration, a pilot time-domain density, a quantity of pilot transmissions, a pilot transmission periodicity, and a moving speed.

Optionally, the communication unit 710 is further configured to receive indication information, where the indication information is used to indicate an index of a target {L, O} in the one or more groups of {L, O}, and the target {L, O} is used to determine the parameter L and the parameter O.

The communication apparatus 700 may implement the steps or the procedure performed by the network device in the method 400 in embodiments of this application. The communication apparatus 700 may include the units configured to perform the method performed by the network device in the method 400 in FIG. 4. In addition, the units in the communication apparatus 700 and the foregoing other operations and/or functions are separately used to implement corresponding procedures of the method 400 in FIG. 4.

When the communication apparatus 700 is configured to perform the method 400 in FIG. 4, the communication unit 710 may be configured to perform step 420 in the method 400.

It should be understood that, a specific process in which each unit performs the foregoing corresponding step has been described in detail in the foregoing method embodiments. For brevity, details are not described herein again.

Figure 10:
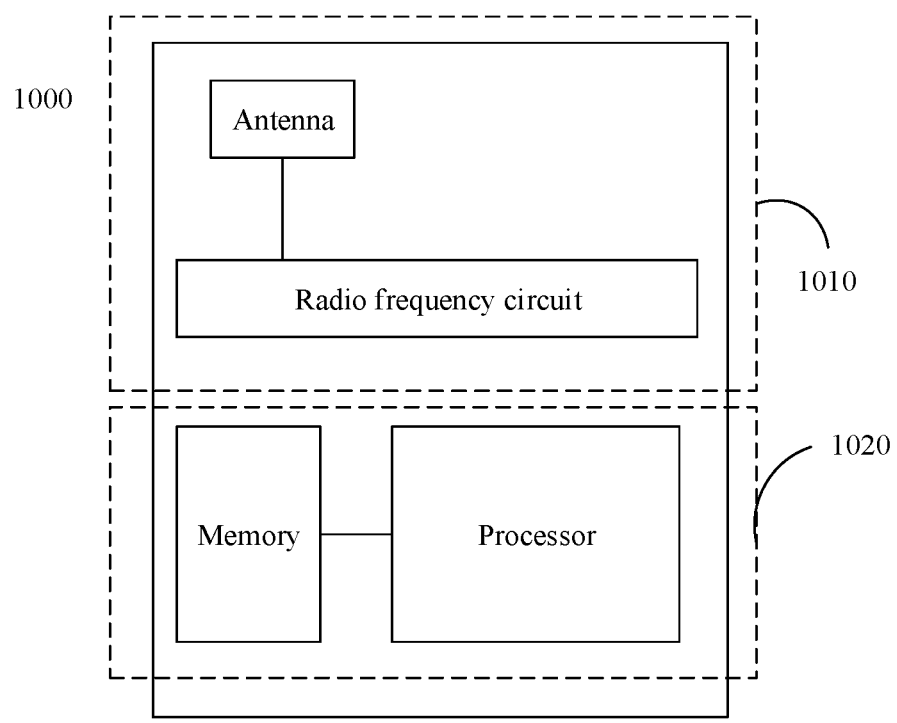
FIG. 10 is a schematic diagram of a structure of a network device according to an embodiment of this application.

It should be further understood that the communication unit in the communication apparatus 700 may be implemented by using a transceiver 1010 in a network device 1000 shown in FIG. 10, and the processing unit 720 in the communication apparatus 700 may be implemented by using a processor 1020 in the network device 1000 shown in FIG. 10.

It should be further understood that the communication unit 710 in the communication apparatus 700 may alternatively be an input/output interface. The transceiver may include a transmitter and/or a receiver, to respectively implement functions of a sending unit and a receiving unit.

Figure 8:
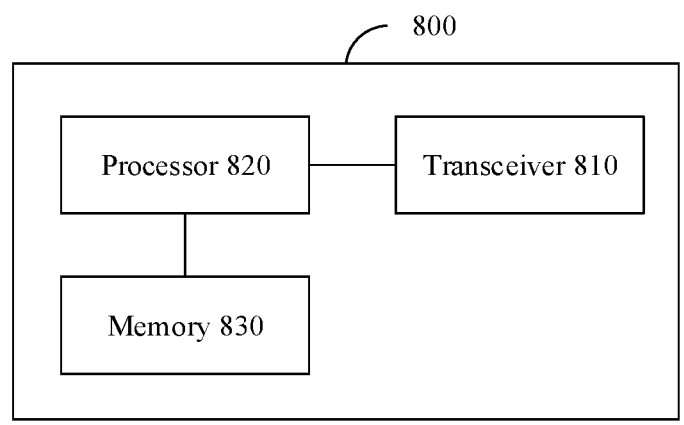
FIG. 8 is another schematic block diagram of a communication apparatus according to an embodiment of this application.

FIG. 8 is another schematic block diagram of a communication apparatus 800 according to an embodiment of this application. As shown in the figure, the communication apparatus 800 includes a transceiver 810, a processor 820, and a memory 830. The memory 830 stores a program. The processor 820 is configured to execute the program stored in the memory 830. Execution of the program stored in the memory 830 enables the processor 820 to perform processing-related steps in the foregoing method embodiments, and enables the processor 820 to control the transceiver 810 to perform receiving/sending-related steps in the foregoing method embodiments.

In an implementation, the communication apparatus 800 is configured to perform the action performed by the terminal device in the foregoing method embodiments. In this case, the execution of the program stored in the memory 830 enables the processor 820 to perform processing steps on the terminal device side in the foregoing method embodiments, and enables the processor 820 to control the transceiver 810 to perform receiving and sending steps on the terminal device side in the foregoing method embodiments.

In another implementation, the communication apparatus 800 is configured to perform the action performed by the network device in the foregoing method embodiments. In this case, the execution of the program stored in the memory 830 enables the processor 820 to perform processing steps on the network device side in the foregoing method embodiments, and enables the processor 820 to control the transceiver 810 to perform receiving and sending steps on the network device side in the foregoing method embodiments.

An embodiment of this application further provides a communication apparatus 900. The communication apparatus 900 may be a terminal device or a chip. The communication apparatus 900 may be configured to perform an action performed by the terminal device in the foregoing method embodiments.

When the communication apparatus 900 is a terminal device, FIG. 9 is a simplified schematic diagram of a structure of a terminal device. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of electromagnetic waves. The input/output apparatus, for example, a touchscreen, a display, or a keyboard, is mainly configured to receive data input by a user and output data to the user. It should be noted that some types of terminal devices may have no input/output apparatus.

When data needs to be sent, the processor performs baseband processing on to-be-sent data, and outputs a baseband signal to the radio frequency circuit. The radio frequency circuit performs radio frequency processing on the baseband signal and then sends a radio frequency signal to the outside in a form of electromagnetic waves through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna with a transceiver function and the radio frequency circuit may be considered as a transceiver unit of the terminal device, and the processor with a processing function may be considered as a processing unit of the terminal device.

As shown in FIG. 9, the terminal device includes a transceiver unit 910 and a processing unit 920. The transceiver unit 910 may also be referred to as a transceiver, a transceiver device, a transceiver apparatus, or the like. The processing unit 920 may also be referred to as a processor, a processing board, a processing module, a processing apparatus, or the like. Optionally, a component in the transceiver unit 910 for implementing a receiving function may be considered as a receiving unit, and a component in the transceiver unit 910 for implementing a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 920 is configured to perform step 410 in FIG. 4, and/or the processing unit 920 is further configured to perform other processing steps on the terminal device side in embodiments of this application. The transceiver unit 910 is further configured to perform step 420 shown in FIG. 4, and/or the transceiver unit 910 is further configured to perform other sending and receiving steps on the terminal device side.

It should be understood that FIG. 9 is merely an example instead of a limitation. The terminal device including the transceiver unit and the processing unit may not depend on the structure shown in FIG. 9.

When the communication device 900 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus 1000. The communication apparatus 1000 may be a network device or a chip. The communication apparatus 1000 may be configured to perform an action performed by the network device in the foregoing method embodiments.

When the communication apparatus 1000 is a network device, for example, a base station, FIG. 10 is a simplified schematic diagram of a structure of the base station. The base station includes a part 1010 and a part 1020. The part 1010 is mainly configured to send and receive a radio frequency signal, and perform conversion between the radio frequency signal and a baseband signal. The part 1020 is mainly configured to perform baseband processing, control the base station, and the like. The part 1010 may usually be referred to as a transceiver unit, a transceiver machine, a transceiver circuit, a transceiver, or the like. The part 1020 is usually a control center of the base station, and may usually be referred to as a processing unit. The part 1020 is configured to control the base station to perform processing operations on the network device side in the foregoing method embodiments.

The transceiver unit of the part 1010 may also be referred to as a transceiver machine, a transceiver, or the like, and includes an antenna and a radio frequency unit. The radio frequency unit is mainly configured to perform radio frequency processing. Optionally, a component in the part 1010 for implementing a receiving function may be considered as a receiving unit, and a component in the part 1010 for implementing a sending function may be considered as a sending unit. In other words, the part 1010 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 1020 may include one or more boards, and each board may include one or more processors and one or more memories. The processor is configured to read and execute a program in the memory to implement a baseband processing function and control the base station. If there are a plurality of boards, the boards may be interconnected with each other to enhance a processing capability. In an optional implementation, the plurality of boards may share one or more processors, or the plurality of boards may share one or more memories, or the plurality of boards may simultaneously share one or more processors.

For example, in an implementation, the transceiver unit in the part 1010 is configured to perform the sending operation on the network device side in step 420 in FIG. 4, and/or the transceiver unit in the part 1010 is further configured to perform other receiving and sending steps on the network device side in embodiments of this application. The processing unit in the part 1020 is configured to perform the processing steps on the network device side in embodiments of this application.

It should be understood that FIG. 10 is merely an example instead of a limitation. The network device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit is a processor, a microprocessor, or an integrated circuit integrated on the chip.

In addition, the network device is not limited to the foregoing form, and may alternatively be in another form. For example, the network device includes an AAU, or may include a CU node and/or a DU node, or include a BBU and an adaptive radio unit (adaptive radio unit, ARU), or a BBU. The network device may alternatively be customer premises equipment (customer premises equipment, CPE), or may be in another form. This is not limited in this application.

The CU and/or DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (field programmable gate array, FPGA), an application-specific integrated chip (application-specific integrated circuit, ASIC), a system on chip (system on chip, SoC), a central processing unit (central processing unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, the steps in the foregoing methods can be implemented by using a hardware integrated logic circuit in the processor, or by using instructions in a form of software. The steps in the methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that, in embodiments of this application, the memory may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memories in the systems and method described in this specification include but are not limited to these memories and any memory of another suitable type.

According to the method provided in the embodiment of this application, this application further provides a computer program product. The computer program product includes computer program code. When the computer program code is run on a computer, the computer is enabled to perform the method in any one of embodiments shown in FIG. 4 to FIG. 6.

According to the method provided in the embodiment of this application, this application further provides a computer-readable medium. The computer-readable medium stores program code. When the program code is run on a computer, the computer is enabled to perform the method in any one of embodiments shown in FIG. 4 to FIG. 6.

According to the method provided in embodiments of this application, this application further provides a system. The system includes the foregoing one or more terminal devices and the foregoing one or more network devices.

In the foregoing embodiments, all or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state disc (solid state disc, SSD)), or the like.

The network device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed on various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
   determining L weighting coefficients for determining channels of K moments based on channels of M moments, wherein L, M, and K are positive integers, wherein determining the L weighting coefficients comprises calculating L' weighting coefficients using O groups of channels, and wherein O and L' are integers greater than or equal to 1, and L' is less than or equal to L; and sending information about the L weighting coefficients.

2. The method according to claim 1, wherein the method further comprises sending information about T measurement channels, wherein the T measurement channels are in N times of channel measurements, wherein N and T are positive integers, and T is greater than or equal to L.

3. The method according to claim 1, wherein determining the L weighting coefficients comprises:

calculating the L weighting coefficients based on P measurement channels, wherein P is greater than or equal to L.

4. The method according to claim 3, wherein:

a time interval between any two adjacent channels in the P measurement channels is same as a time interval between any two adjacent channels in at least L measurement channels in T measurement channels.

5. The method according to claim 1, wherein the method further comprises obtaining information about a parameter O, wherein:

calculating the L' weighting coefficients using the O groups of channels comprises:

calculating the L' weighting coefficients based on the L and the parameter O using the O groups of channels; and sending the information about the L weighting coefficients comprises:

sending information about the L' weighting coefficients.

6. The method according to claim 5, wherein obtaining information about the parameter O comprises:

determining a target {L, O} from one or more groups of {L, O}; and determining a value of the L and a value of the parameter O based on the target {L, O}.

7. A communication apparatus, comprising:

at least one processor; and one or more memories coupled to the at least one processor and storing programming instructions for execution by the at least one processor to perform operations comprising:

determining L weighting coefficients for determining channels of K moments based on channels of M moments, wherein L, M, and K are positive integers, wherein determining the L weighting coefficients comprises calculating L' weighting coefficients using O groups of channels, and wherein O and L' are integers greater than or equal to 1, and L' is less than or equal to L; and sending information about the L weighting coefficients.

8. The communication apparatus according to claim 7, wherein the operations comprise sending information about T measurement channels, wherein the T measurement channels are in N times of channel measurements, wherein N and T are positive integers, and T is greater than or equal to L.

9. The communication apparatus according to claim 7, wherein the operations comprise:

calculating the L weighting coefficients based on P measurement channels, wherein P is greater than or equal to L.

10. The communication apparatus according to claim 9, wherein:

a time interval between any two adjacent channels in the P measurement channels is same as a time interval between any two adjacent channels in at least L measurement channels in T measurement channels.

11. The communication apparatus according to claim 7, wherein the operations comprise obtaining information about a parameter O, wherein:

calculating the L' weighting coefficients using the O groups of channels comprises:

calculating the L' weighting coefficients based on the L and the parameter O using the O groups of channels; and sending the information about the L weighting coefficients comprises:

sending information about the L' weighting coefficients.

12. The communication apparatus according to claim 11, wherein the operations comprise:

determining a target {L, O} from one or more groups of {L, O}; and determining a value of the L and a value of the parameter O based on the target {L, O}.

13. The communication apparatus according to claim 12, wherein each of the one or more groups of {L, O} corresponds to one or more of the following information:

measurement duration, a pilot time-domain density, a quantity of pilot transmissions, a pilot transmission periodicity, and a moving speed.

14. The communication apparatus according to claim 12, wherein the operations comprise:

sending indication information, wherein the indication information indicates an index of the target {L, O}.

15. A communication apparatus, comprising:

at least one processor; and one or more memories coupled to the at least one processor and storing programming instructions for execution by the at least one processor to perform operations comprising:

receiving information about L weighting coefficients, wherein the L weighting coefficients are used to determine channels of K moments based on channels of M moments, wherein L, M, and K are positive integers, wherein receiving the information about the L weighting coefficients comprises receiving information about L' weighting coefficients, wherein the L' weighting coefficients are calculated using O groups of channels, and wherein both O and L' are integers greater than or equal to 1, and L' is less than or equal to L; and determining the L weighting coefficients.

16. The communication apparatus according to claim 15, wherein the operations comprise receiving information about T measurement channels, wherein the T measurement channels are in N times of channel measurements, wherein N and T are positive integers, and T is greater than or equal to L.

17. The communication apparatus according to claim 15, wherein the operations comprise sending information indicating a parameter O and the L, wherein the L' weighting coefficients are calculated based on the parameter O and the L using the O groups of channels.

18. The communication apparatus according to claim 17, wherein the operations comprise:

sending information indicating one or more groups of {L, O}, wherein the one or more groups of {L, O} are used to determine a value of the L and a value of the parameter O.

19. The communication apparatus according to claim 18, wherein each of the one or more groups of {L, O} corresponds to one or more of the following information:
- measurement duration, a pilot time-domain density, a quantity of pilot transmissions, a pilot transmission periodicity, and a moving speed.

20. The communication apparatus according to claim 18, wherein the operations comprise:
- receiving indication information, wherein the indication information indicates an index of a target {L, O} in the one or more groups of {L, O}, and the target {L, O} is used to determine the L and the parameter O.

* * * * *

UNITED STATES PATENT AND TRADEMARK OFFICE
CERTIFICATE OF CORRECTION

PATENT NO. : 12,166,552 B2
APPLICATION NO. : 17/681281
DATED : December 10, 2024
INVENTOR(S) : Xiang Ren et al.

Page 1 of 1

It is certified that error appears in the above-identified patent and that said Letters Patent is hereby corrected as shown below:

In the Claims

In Column 43, In Line 9 (Approx.), In Claim 2, delete "Tis" and insert -- T is --.

Signed and Sealed this
Twenty-fifth Day of March, 2025

Coke Morgan Stewart
*Acting Director of the United States Patent and Trademark Office*